(12) United States Patent
Yang et al.

(10) Patent No.: US 10,579,072 B2
(45) Date of Patent: Mar. 3, 2020

(54) METHOD FOR CONTROLLING VEHICLE

(71) Applicant: LG ELECTRONICS INC., Seoul (KR)

(72) Inventors: Yoonseok Yang, Seoul (KR); Soyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 194 days.

(21) Appl. No.: 15/721,185

(22) Filed: Sep. 29, 2017

(65) Prior Publication Data

US 2018/0341277 A1 Nov. 29, 2018

(30) Foreign Application Priority Data

May 24, 2017 (KR) .................. 10-2017-0064350

(51) Int. Cl.

| | | |
|---|---|---|
| *G05F 1/02* | (2006.01) | |
| *G08G 1/01* | (2006.01) | |
| *H04L 29/08* | (2006.01) | |
| *G05D 1/02* | (2020.01) | |
| *H04W 4/04* | (2009.01) | |

(Continued)

(52) U.S. Cl.

CPC .......... *G05D 1/0293* (2013.01); *A63F 13/31* (2014.09); *A63F 13/327* (2014.09); *A63F 13/332* (2014.09); *A63F 13/34* (2014.09); *A63F 13/48* (2014.09); *A63F 13/65* (2014.09); *A63F 13/795* (2014.09); *A63F 13/847* (2014.09); *B60W 30/00* (2013.01); *G06Q 10/04* (2013.01); *G06Q 10/1093* (2013.01); *G06Q 50/30* (2013.01); *G08G 1/0112* (2013.01); *G08G 1/0962* (2013.01); *G08G 1/22* (2013.01); *H04L 67/125* (2013.01); *H04W 4/046* (2013.01); *H04W 4/40* (2018.02); *A63F 13/216* (2014.09)

(58) Field of Classification Search

CPC ...... A63F 13/216; A63F 13/31; A63F 13/327; A63F 13/332; A63F 13/34; A63F 13/48; A63F 13/65; A63F 13/795; A63F 13/847; B60W 30/00; G05D 1/0293; G06Q 10/00; G08G 1/0112; G08G 1/0962; G08G 1/122; H04L 67/125; H04W 4/046; H04W 4/40

See application file for complete search history.

(56) References Cited

U.S. PATENT DOCUMENTS

| | | | | |
|---|---|---|---|---|
| 8,352,112 | B2 * | 1/2013 | Mudalige | G08G 1/22 340/435 |
| 10,380,898 | B1 * | 8/2019 | Schubert | G05D 1/0291 |
| 2016/0267796 | A1 * | 9/2016 | Hiroma | G08G 1/22 |

FOREIGN PATENT DOCUMENTS

| | | |
|---|---|---|
| KR | 10-2015-0138055 A | 12/2015 |
| KR | 10-2016-0127492 A | 11/2016 |
| WO | WO 2016/0153408 A1 | 9/2016 |

* cited by examiner

*Primary Examiner* — Robert T Nguyen
(74) *Attorney, Agent, or Firm* — Birch, Stewart, Kolasch & Birch, LLP

(57) ABSTRACT

A method of controlling a vehicle, and which includes wirelessly communicating, via a wireless communication unit, with at least one other vehicle; displaying, via a display, a list of activities that are executable together during a commonly available autonomous driving time period where both the vehicle and the least one other vehicle are operated in an autonomous driving mode; receiving, via a controller, a selection of an activity in the displayed list of activities;

(Continued)

and displaying, via the display, an execution screen of the selected activity during the commonly available autonomous driving period.

18 Claims, 20 Drawing Sheets

(51) Int. Cl.
*A63F 13/34* (2014.01)
*H04W 4/40* (2018.01)
*G06Q 10/04* (2012.01)
*A63F 13/847* (2014.01)
*A63F 13/327* (2014.01)
*A63F 13/65* (2014.01)
*G06Q 50/30* (2012.01)
*G08G 1/0962* (2006.01)
*A63F 13/48* (2014.01)
*G06Q 10/10* (2012.01)
*A63F 13/332* (2014.01)
*G08G 1/00* (2006.01)
*A63F 13/31* (2014.01)
*B60W 30/00* (2006.01)
*A63F 13/795* (2014.01)
*A63F 13/216* (2014.01)

FIG. 1
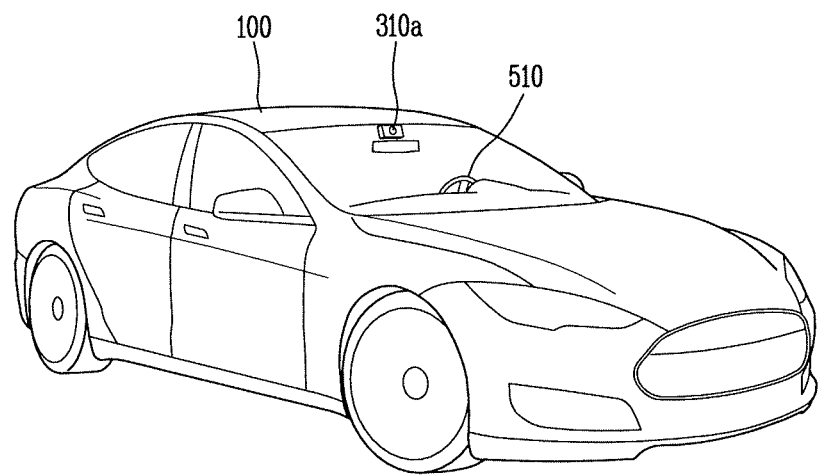
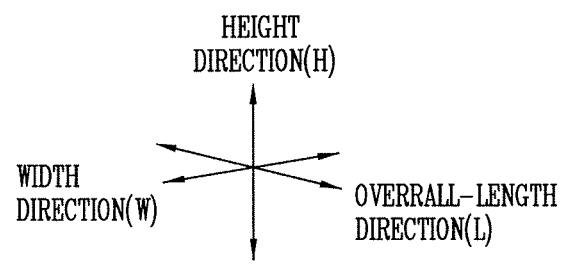

FIG. 21
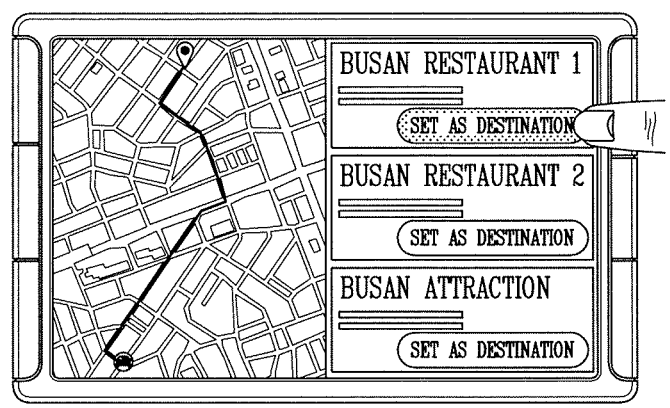
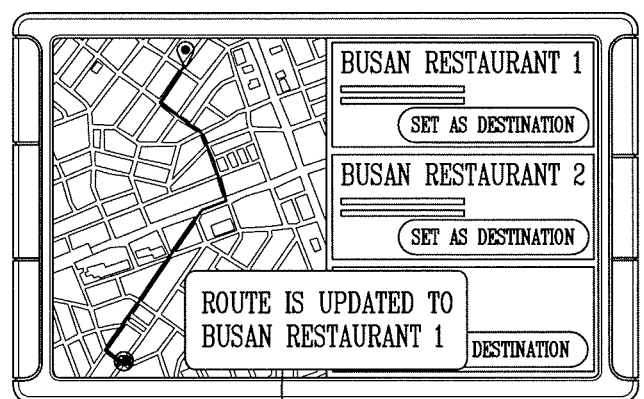
2110

METHOD FOR CONTROLLING VEHICLE

CROSS-REFERENCE TO RELATED APPLICATION

Pursuant to 35 U.S.C. § 119(a), this application claims the benefit of an earlier filing date of and the right of priority to Korean Application No. 10-2017-0064350, filed on May 24, 2017, the contents of which are incorporated by reference herein in its entirety.

BACKGROUND OF THE INVENTION

1. Field of the Invention

The present disclosure relates to a method and apparatus for controlling a vehicle.

2. Background of the Invention

A vehicle is an apparatus capable of moving a user in his or her desired direction, and a representative example includes a car. For convenience of the user using the vehicle, various types of sensors and electronic devices are provided in the vehicle. Specifically, a study on an Advanced Driver Assistance System (ADAS) is actively undergoing. In addition, an autonomous vehicle is actively under development.

As the development of the ADAS is actively undergoing in recent time as described above, development of a technology for optimizing the user's convenience and safety while driving a vehicle is required. When autonomous driving is performed, a time required for driving a vehicle may be saved. Accordingly, a driver's need for how to perform various activities that can be performed at the time given by autonomous driving may occur.

SUMMARY OF THE INVENTION

An object of the present disclosure is to solve the foregoing problems and other problems.

Another object of the present disclosure is to provide a control method and apparatus for calculating a commonly available autonomous driving time based on autonomous driving schedule information of a vehicle and other vehicles capable of communicating with the vehicle, and recommending a list of activities that are executable together for the calculated time.

In order to accomplish the foregoing or other objects, according to an aspect of the present disclosure, there is provided a method of controlling a vehicle, and the method may include searching for another vehicles capable of communicating with a vehicle; calculating a commonly available autonomous driving time period based on autonomous driving schedule information of the vehicle and the other vehicle; and displaying a list of activities that are executable together during the calculated time period.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a view illustrating an appearance of a vehicle according to an embodiment of the present disclosure;

FIG. 21 is a conceptual view illustrating an embodiment of sharing information while performing platooning.

DETAILED DESCRIPTION OF THE INVENTION

Figure 2:
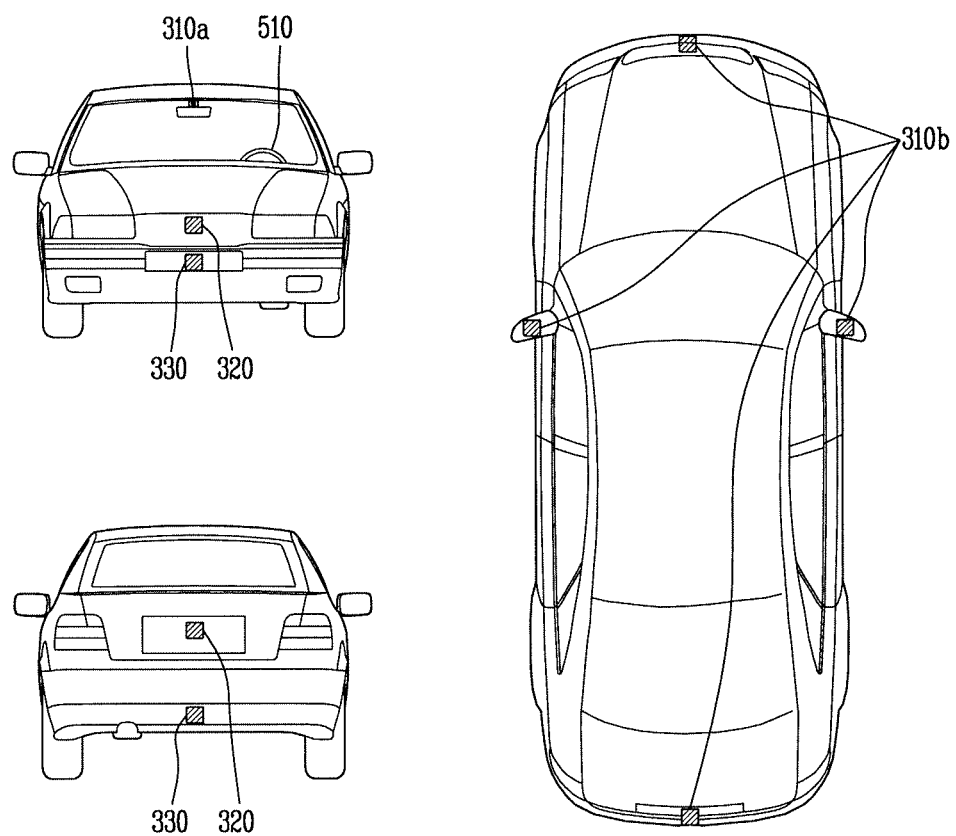
FIG. 2 is a view in which a vehicle according to an embodiment of the present disclosure is seen from various angles.
Figure 3:
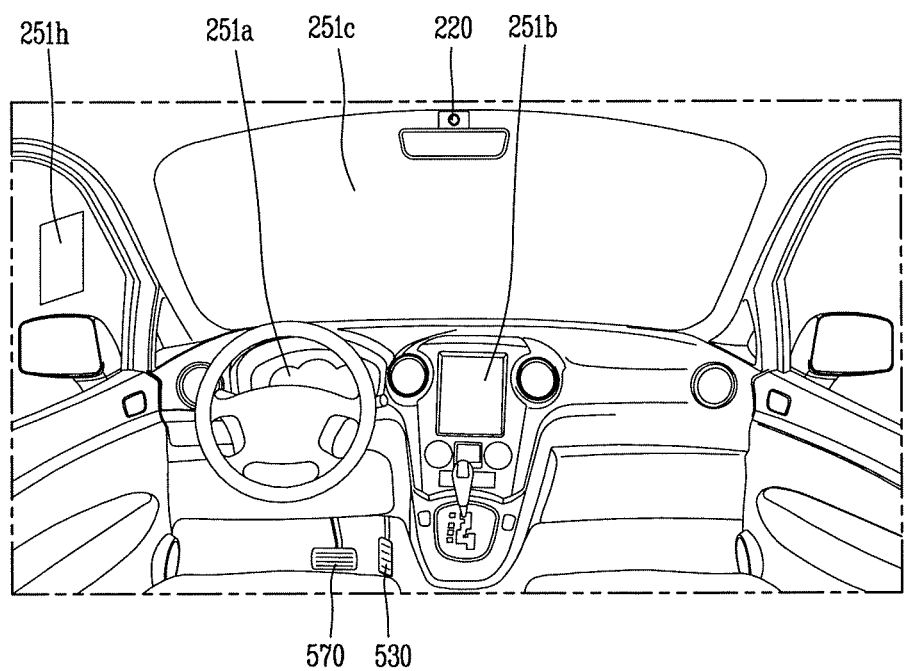
FIGS. 3 and 4 are views illustrating an inside of a vehicle according to an embodiment of the present disclosure.
Figure 4:
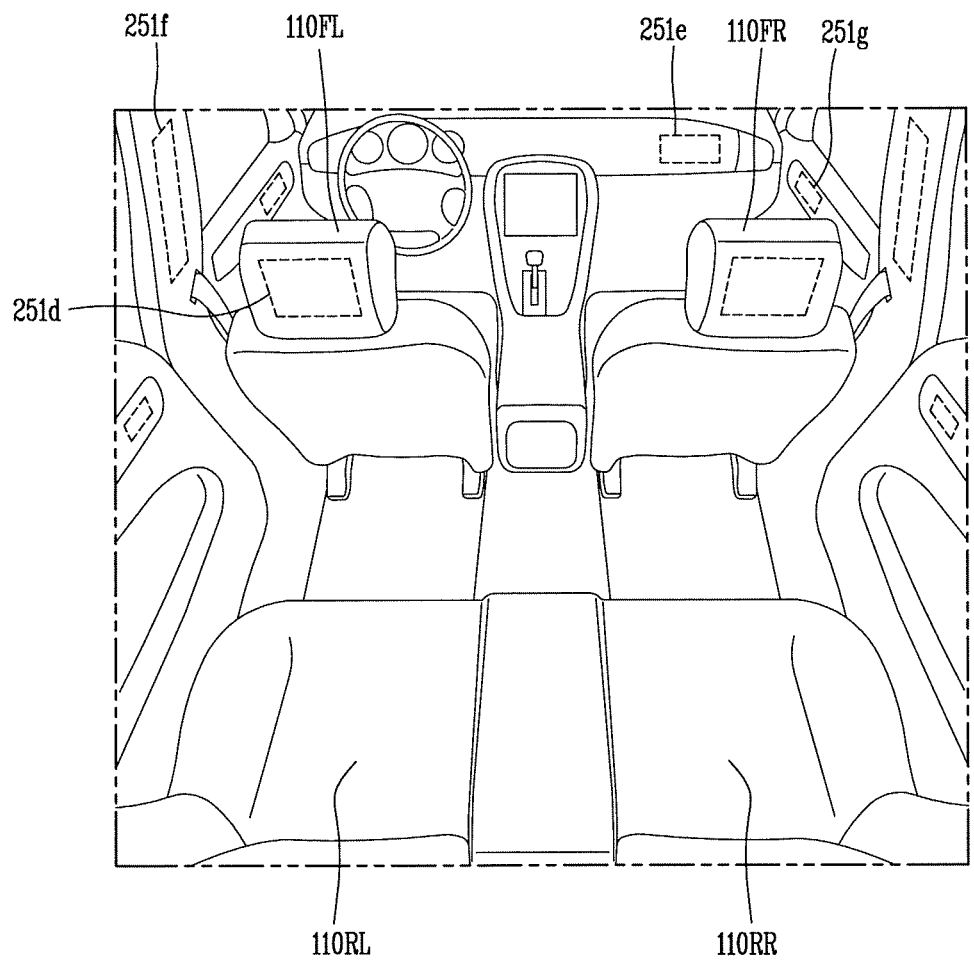

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present disclosure includes cars, motorcycles and the like. Hereinafter, the vehicle will be described based on a car. However, the vehicle according to the embodiment of the present disclosure includes all of an internal combustion engine car having an engine as a power source, a hybrid vehicle having an engine and an electric motor as power sources, an electric vehicle having an electric motor as a power source, and the like. In the following description, a left side of a vehicle refers to a left side in a driving direction of the vehicle, and a right side of the vehicle refers to a right side in the driving direction.

As illustrated in FIGS. 1 to 7, a vehicle 100 includes wheels turning by a driving force, and a steering apparatus 510 for adjusting a driving (ongoing, moving) direction of the vehicle 100. The vehicle 100 may be an autonomous vehicle and can be switched into an autonomous mode or a manual mode based on a user input.

For example, the vehicle 100 can be converted from the manual mode into the autonomous mode or from the autonomous mode into the manual mode based on a user input received through a user interface apparatus 200. The vehicle 100 can also be switched into the autonomous mode or the manual mode based on driving environment information.

Further, the driving environment information can be generated based on object information provided from an object detecting apparatus 300. For example, the vehicle 100 can be switched from the manual mode into the autonomous mode or from the autonomous module into the manual mode based on driving environment information generated in the object detecting apparatus 300. In an example, the vehicle 100 can be switched from the manual mode into the autonomous mode or from the autonomous module into the manual mode based on driving environment information received through a communication apparatus 400.

The vehicle 100 can also be switched from the manual mode into the autonomous mode or from the autonomous module into the manual mode based on information, data or signal provided from an external device. When the vehicle 100 is driven in the autonomous mode, the autonomous vehicle 100 can be driven based on an operation system 700. For example, the autonomous vehicle 100 can be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 can then be driven based on the user input received through the driving control apparatus 500. In addition, an overall length refers to a length from a front end to a rear end of the vehicle 100, a width refers to a width of the vehicle 100, and a height refers to a length from a bottom of a wheel to a roof. In the following description, an overall-length direction L refers to a direction which is a criterion for measuring the overall length of the vehicle 100, a width direction W refers to a direction that is a criterion for measuring a width of the vehicle 100, and a height direction H refers to a direction that is a criterion for measuring a height of the vehicle 100.

Figure 7:
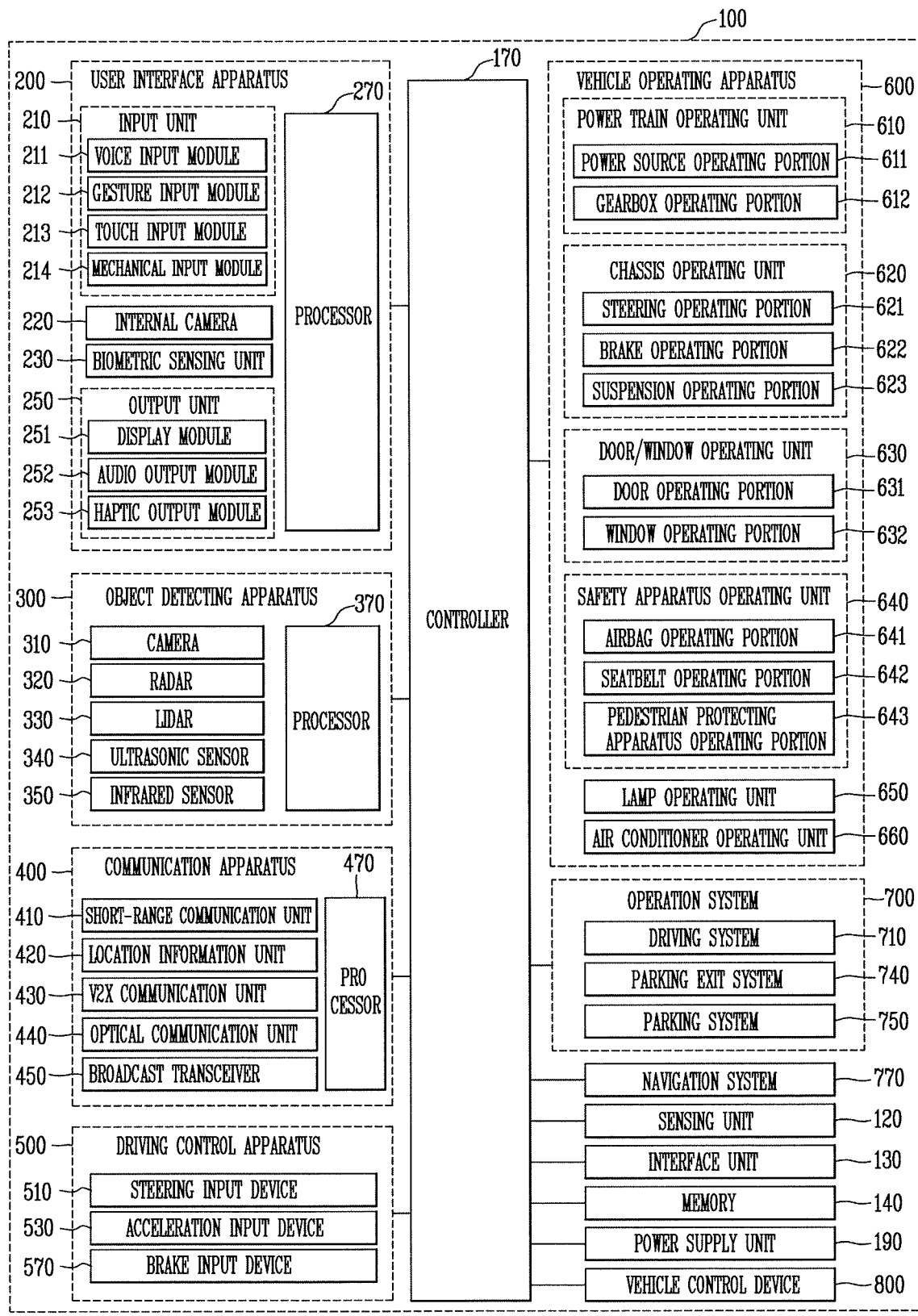
FIG. 7 is a block diagram illustrating a vehicle according to an embodiment of the present disclosure.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190. The vehicle 100 may include more components in addition to components to be explained in this specification or may not include some of those components to be explained in this specification.

In addition, the user interface apparatus 200 is for communication between the vehicle 100 and a user. The user interface apparatus 200 can receive a user input and provide information generated in the vehicle 100 to the user. The vehicle 200 can also implement user interfaces (UIs) or user experiences (UXs) through the user interface apparatus 200.

Further, the user interface apparatus 200 may include an input unit 210, an internal camera 220, a biometric sensing unit 230, an output unit 250 and a processor 270. The user interface apparatus 200 may include more components in addition to components to be explained in this specification or may not include some of those components to be explained in this specification.

In addition, the input unit 200 allows the user to input information. Then, data collected in the input unit 120 can be analyzed by the processor 270 and processed as a user's control command. The input unit 210 can be disposed within the vehicle such as on one area of a steering wheel, one area of an instrument panel, one area of a seat, one area of each pillar, one area of a door, one area of a center console, one area of a headlining, one area of a sun visor, one area of a wind shield, one area of a window or the like.

Further, the input unit 210 may include a voice input module 211, a gesture input module 212, a touch input module 213, and a mechanical input module 214. The audio input module 211 may convert a user's voice input into an electric signal. The converted electric signal can be provided to the processor 270 or the controller 170.

The voice input module 211 may include at least one microphone, and the gesture input module 212 may convert a user's gesture input into an electric signal. The converted electric signal can be provided to the processor 270 or the controller 170. Further, the gesture input module 212 may include at least one of an infrared sensor and an image sensor for detecting the user's gesture input.

The gesture input module 212 can also detect a user's three-dimensional (3D) gesture input. For example, the gesture input module 212 may include a light emitting diode outputting a plurality of infrared rays or a plurality of image sensors. The gesture input module 212 can then detect the user's 3D gesture input by a time of flight (TOF) method, a structured light method or a disparity method.

The touch input module 213 can convert the user's touch input into an electric signal and the converted electric signal can be provided to the processor 270 or the controller 170. The touch input module 213 may also include a touch sensor for detecting the user's touch input.

In addition, the touch input module 213 can be integrated with the display unit 251 so as to implement a touch screen. In more detail, the touch screen provides an input interface and an output interface between the vehicle 100 and the user. Further, the mechanical input module 214 may include at least one of a button, a dome switch, a jog wheel and a jog switch. An electric signal generated by the mechanical input module 214 can then be provided to the processor 270 or the controller 170.

The mechanical input module 214 can be arranged on a steering wheel, a center fascia, a center console, a cockpit module, a door and the like. Also, the internal camera 220 can acquire an internal image of the vehicle, and the processor 270 can detect a user's state based on the internal image of the vehicle. The processor 270 can also acquire information related to the user's gaze from the internal image of the vehicle, as well as detect a user gesture from the internal image of the vehicle.

Further, the biometric sensing unit 230 can acquire the user's biometric information. The biometric sensing module 230 may include a sensor for detecting the user's biometric information and acquire fingerprint information and heart rate information regarding the user using the sensor. The biometric information can also be used for user authentication.

The output unit 250 can generate an output related to a visual, audible or tactile signal. The output unit 250 may include at least one of a display module 251, an audio output module 252 and a haptic output module 253. The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display. The display module 251 can be inter-layered or integrated with a touch input module 213 to implement a touch screen.

The display module 251 can also be implemented as a head up display (HUD). When the display module 251 is implemented as the HUD, the display module 251 can be provided with a projecting module so as to output information through an image which is projected on a windshield or a window.

Further, the display module 251 may include a transparent display attached to the windshield or the window. The transparent display has a predetermined degree of transparency and outputs a predetermined screen thereon. The transparent display may include at least one of a thin film electroluminescent (TFEL), a transparent OLED, a transparent LCD, a transmissive transparent display and a transparent LED display. The transparent display may also have adjustable transparency.

The user interface apparatus 200 may include a plurality of display modules 251*a* through 251*g*. The display module 251 can be disposed on one area of a steering wheel, one area 251*a*, 251*b*, 251*e* of an instrument panel, one area 251*d* of a seat, one area 251*f* of each pillar, one area 251*g* of a door, one area of a center console, one area of a headlining or one area of a sun visor, or implemented on one area 251*c* of a windshield or one area 251*h* of a window.

Further, the audio output module 252 converts an electric signal provided from the processor 270 or the controller 170 into an audio signal for output. Thus, the audio output module 252 may include at least one speaker. The haptic output module 253 generates a tactile output. For example, the haptic output module 253 may vibrate the steering wheel, a safety belt, a seat 110FL, 110FR, 110RL, 110RR such that the user can recognize such output.

In addition, the processor 270 controls an overall operation of each unit of the user interface apparatus 200. Also, the user interface apparatus 200 may include a plurality of processors 270 or may not include any processor 270. When the processor 270 is not included in the user interface apparatus 200, the user interface apparatus 200 can operate according to a control of a processor of another apparatus within the vehicle 100 or the controller 170.

The user interface apparatus 200 can also be called as a display apparatus for vehicle and operate according to the control of the controller 170. Further, the object detecting apparatus 300 detects an object located at outside of the vehicle 100. The object can be a variety of objects associated with driving (operation) of the vehicle 100.

Figure 5:
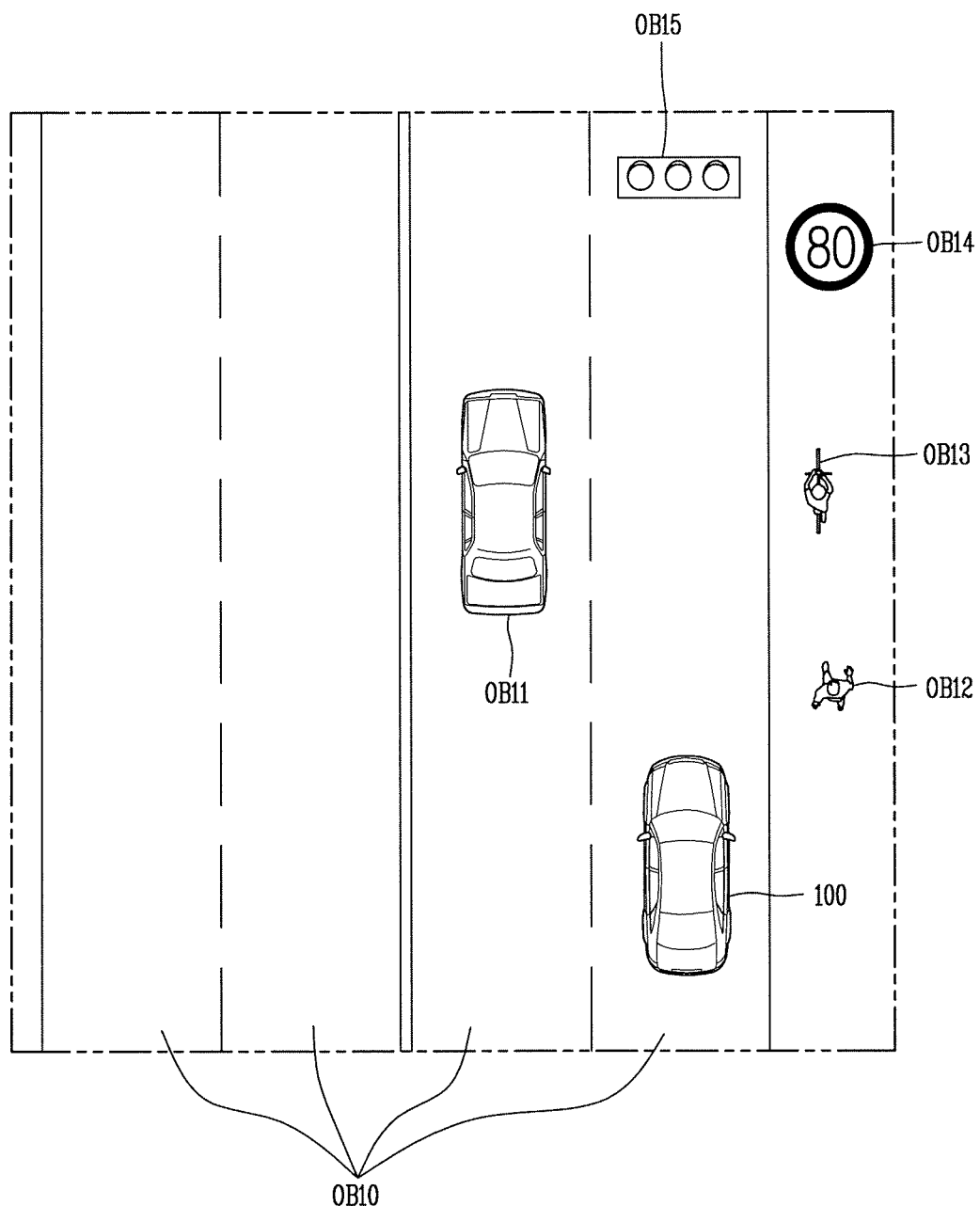
FIGS. 5 and 6 are views referred to explain an object according to an embodiment of the present disclosure.
Figure 6:
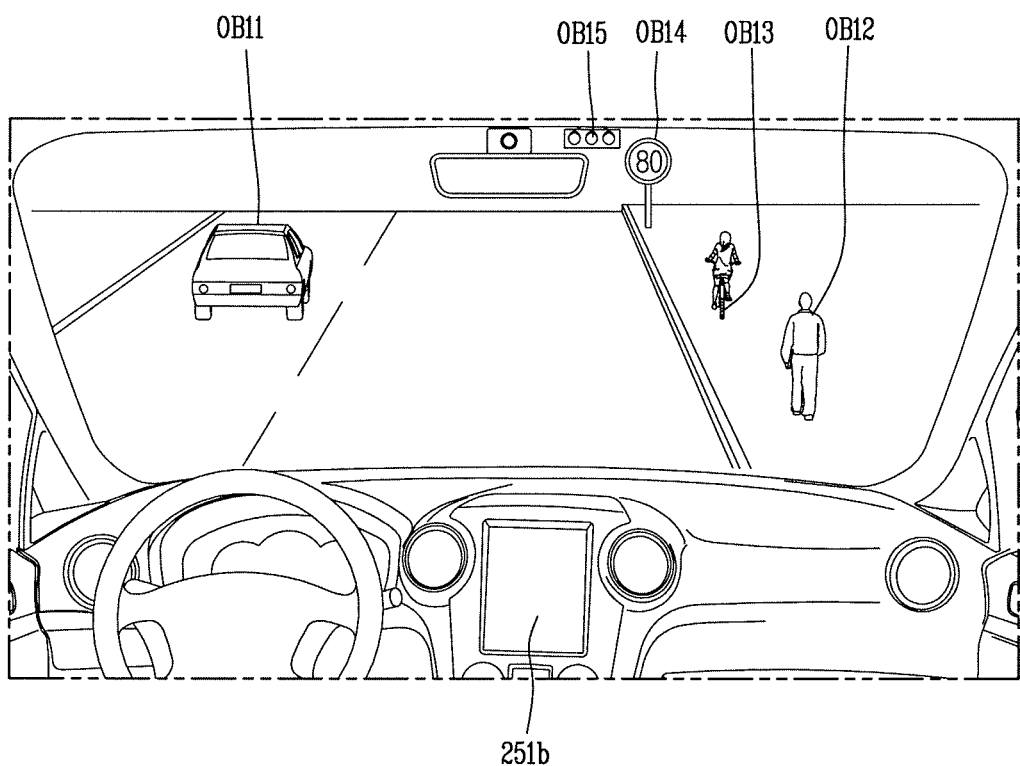

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like. The lane OB01 can be a driving lane, a lane next to the driving lane or a lane on which another vehicle comes in an opposite direction to the vehicle 100. The lanes OB10 include left and right lines forming a lane.

The other vehicle OB11 can be a vehicle which is moving around the vehicle 100. The other vehicle OB11 can also be a vehicle located within a predetermined distance from the vehicle 100. For example, the other vehicle OB11 can be a vehicle which moves before or after the vehicle 100. Further, the pedestrian OB12 can be a person located near the vehicle 100. The pedestrian OB12 can also be a person located within a predetermined distance from the vehicle 100. For example, the pedestrian OB12 can be a person located on a sidewalk or roadway.

The two-wheeled vehicle OB13 refers to a vehicle (transportation facility) that is located near the vehicle 100 and moves using two wheels. The two-wheeled vehicle OB13 can be a vehicle that is located within a predetermined distance from the vehicle 100 and has two wheels. For example, the two-wheeled vehicle OB13 can be a motorcycle or a bicycle that is located on a sidewalk or roadway.

The traffic signals may include a traffic light OB15, a traffic sign OB14 and a pattern or text drawn on a road surface. The light can also be light emitted from a lamp provided on another vehicle. The light can be light generated from a streetlamp or can be solar light. The road may include a road surface, a curve, an upward slope, a downward slope and the like.

In addition, the structure can be an object that is located near a road and fixed on the ground. For example, the structure may include a streetlamp, a roadside tree, a building, an electric pole, a traffic light, a bridge and the like. The geographical feature may include a mountain, a hill and the like. Also, objects can be classified into a moving object and a fixed object. For example, the moving object can be another vehicle and a pedestrian, and the fixed object can be a traffic signal, a road and a structure.

As shown in FIG. 7, the object detecting apparatus 300 may include a camera 310, a radar 320, a LiDAR 330, an ultrasonic sensor 340, an infrared sensor 350 and a processor 370. Also, the object detecting apparatus 300 may further include other components in addition to the components described, or may not include some of the components described.

The camera 310 can be located on an appropriate portion outside the vehicle to acquire an external image of the vehicle. The camera 310 can be a mono camera, a stereo camera 310a, an around view monitoring (AVM) camera 310b or a 360-degree camera. For example, the camera 310 can be disposed adjacent to a front windshield within the vehicle to acquire a front image of the vehicle. Or, the camera 310 can be disposed adjacent to a front bumper or a radiator grill.

For example, the camera 310 can be disposed adjacent to a rear glass within the vehicle to acquire a rear image of the vehicle. Alternatively, the camera 310 can be disposed adjacent to a rear bumper, a trunk or a tail gate. For example, the camera 310 can be disposed adjacent to at least one of side windows within the vehicle to acquire a side image of the vehicle. The camera 310 can also be disposed adjacent to a side mirror, a fender or a door. Further, the camera 310 can provide an acquired image to the processor 370.

The radar 320 may include electric wave transmitting and receiving portions and can be implemented as a pulse radar or a continuous wave radar according to a principle of emitting electric waves. The radar 320 can be implemented in a frequency modulated continuous wave (FMCW) manner or a frequency shift Keyong (FSK) manner according to a signal waveform, among the continuous wave radar methods.

In addition, the radar 320 can detect an object in a time of flight (TOF) manner or a phase-shift manner through the medium of the electric wave, and detect a position of the detected object, a distance from the detected object and a relative speed with the detected object. The radar 320 can also be disposed on an appropriate position outside the vehicle for detecting an object which is located at a front, rear or side of the vehicle.

The LiDAR 330 may include laser transmitting and receiving portions and can be implemented in a time of flight (TOF) manner or a phase-shift manner. The LiDAR 330 can be implemented as a drive type or a non-drive type. For the drive type, the LiDAR 330 can be rotated by a motor and detect object near the vehicle 100.

For the non-drive type, the LiDAR 330 can detect, through light steering, objects which are located within a predetermined range based on the vehicle 100. The vehicle 100 may include a plurality of non-drive type LiDARs 330. The LiDAR 330 can also detect an object in a TOP manner or a phase-shift manner through the medium of a laser beam, and detect a position of the detected object, a distance from the detected object and a relative speed with the detected object. The LiDAR 330 can be disposed on an appropriate position outside the vehicle for detecting an object located at the front, rear or side of the vehicle.

Further, the ultrasonic sensor 340 includes ultrasonic wave transmitting and receiving portions, can detect an object based on an ultrasonic wave, and detect a position of the detected object, a distance from the detected object and a relative speed with the detected object. The ultrasonic sensor 340 can be disposed on an appropriate position outside the vehicle for detecting an object located at the front, rear or side of the vehicle.

In addition, the infrared sensor 350 includes infrared light transmitting and receiving portions, can detect an object based on infrared light, and detect a position of the detected object, a distance from the detected object and a relative speed with the detected object. The infrared sensor 350 can be disposed on an appropriate position outside the vehicle for detecting an object located at the front, rear or side of the vehicle.

In addition, the processor 370 controls an overall operation of each unit of the object detecting apparatus 300, and can detect an object based on an acquired image, and track the object. The processor 370 can also execute operations, such as a calculation of a distance from the object, a calculation of a relative speed with the object and the like, through an image processing algorithm.

Further, the processor 370 can detect an object based on a reflected electromagnetic wave which an emitted electromagnetic wave is reflected from the object, and track the object. The processor 370 can execute operations, such as a calculation of a distance from the object, a calculation of a relative speed with the object and the like, based on the electromagnetic wave.

The processor 370 can also detect an object based on a reflected laser beam which an emitted laser beam is reflected from the object, and track the object. Further, the processor 370 can execute operations, such as a calculation of a distance from the object, a calculation of a relative speed with the object and the like, based on the laser beam.

The processor 370 can detect an object based on a reflected ultrasonic wave which an emitted ultrasonic wave is reflected from the object, and track the object. The processor 370 can also execute operations, such as a calculation of a distance from the object, a calculation of a relative speed with the object and the like, based on the ultrasonic wave.

In addition, the processor 370 can detect an object based on reflected infrared light which emitted infrared light is reflected from the object, and track the object. The processor 370 can also execute operations, such as a calculation of a distance from the object, a calculation of a relative speed with the object and the like, based on the infrared light.

Further, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 can operate according to the control of a processor of an apparatus within the vehicle 100 or the controller 170. The object detecting apparatus 300 can also operate according to the control of the controller 170.

Further, the communication apparatus 400 performs communication with an external device such as another vehicle, a mobile terminal or a server. The communication apparatus 400 can also perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470. The communication apparatus 400 may further include other components in addition to the components described, or may not include some of the components described.

In addition, the short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication unit 410 may construct short-range area networks to perform short-range communication between the vehicle 100 and at least one external device.

The location information unit 420 can acquire position information. For example, the location information unit 420 may include a Global Positioning System (GPS) module or a Differential Global Positioning System (DGPS) module. The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 performs communication with an external device through the medium of light. The optical communication unit 440 may include a light-emitting diode for converting an electric signal into an optical signal and sending the optical signal to the exterior, and a photodiode for converting the received optical signal into an electric signal. In addition, the light-emitting diode can be integrated with lamps provided on the vehicle 100.

In addition, the broadcast transceiver 450 can receive a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

Further, the processor 470 controls an overall operation of each unit of the communication apparatus 400. In addition, the communication apparatus 400 may include a plurality of processors 470 or may not include any processor 470. When the processor 470 is not included in the communication apparatus 400, the communication apparatus 400 may operate according to the control of a processor of another device within the vehicle 100 or the controller 170. The communication apparatus 400 can also implement a display apparatus for a vehicle together with the user interface apparatus 200. In this instance, the display apparatus for the vehicle can be referred to as a telematics apparatus or an Audio Video Navigation (AVN) apparatus. The communication apparatus 400 may operate according to the control of the controller 170.

In addition, the driving control apparatus 500 receives a user input for driving. In a manual mode, the vehicle 100 can be operated based on a signal provided by the driving control apparatus 500. The driving control apparatus 500 also includes a steering input device 510, an acceleration input device 530 and a brake input device 570, for example.

Further, the steering input device 510 can receive an input regarding a driving (ongoing) direction of the vehicle 100 from the user. The steering input device 510 is preferably a wheel allowing a steering input in a rotating manner. The steering input device may also be configured in a shape of a touch screen, a touchpad or a button.

Also, the acceleration input device 530 can receive an input for accelerating the vehicle 100 from the user. The brake input device 570 can also receive an input for braking the vehicle 100 from the user. Each of the acceleration input device 530 and the brake input device 570 is preferably configured in the form of a pedal. The acceleration input device or the brake input device may also be configured in a shape of a touch screen, a touchpad or a button.

In addition, the driving control apparatus 500 can operate according to the control of the controller 170. Further, the vehicle operating apparatus 600 electrically controls operations of various devices within the vehicle 100. The vehicle operating apparatus 600 may include a power train operating unit 610, a chassis operating unit 620, a door/window operating unit 630, a safety apparatus operating unit 640, a lamp operating unit 650, and an air-conditioner operating unit 660.

The vehicle operating apparatus 600 may further include other components in addition to the components described, or may not include some of the components described. The vehicle operating apparatus 600 may include a processor, and each unit of the vehicle operating apparatus 600 may individually include a processor.

In addition, the power train operating unit 610 can control an operation of a power train device and include a power source operating portion 611 and a gearbox operating portion 612. The power source operating portion 611 can provide a power source of the vehicle 100. For example, upon using a fossil fuel-based engine as the power source, the power source operating portion 611 can perform an electronic control for the engine. Accordingly, an output torque and the like of the engine can be controlled.

The power source operating portion 611 can also adjust the engine output torque according to the control of the controller 170. For example, upon using an electric energy-based motor as the power source, the power source operating portion 611 can perform a control for the motor. The power source operating portion 611 can also adjust a rotating speed, a torque and the like of the motor according to the control of the controller 170.

The gearbox operating portion 612 can perform a control for a gearbox and adjust a state of the gearbox. The gearbox operating portion 612 can change the state of the gearbox into drive (forward) (D), reverse (R), neutral (N) or parking (P). When an engine is the power source, the gearbox operating portion 612 can adjust a locked state of a gear in the drive (D) state.

Further, the chassis operating unit 620 can control an operation of a chassis device and include a steering operating portion 621, a brake operating portion 622 and a suspension operating portion 623. The steering operating portion 621 can perform an electronic control for a steering apparatus within the vehicle 100 and change a driving direction of the vehicle.

The brake operating portion 622 can perform an electronic control for a brake apparatus within the vehicle 100. For example, the brake operating portion 622 can control an operation of brakes provided at wheels to reduce speed of the vehicle 100. The brake operating portion 622 can individually control each of a plurality of brakes and differently control braking force applied to each of a plurality of wheels.

The suspension operating portion 623 can perform an electronic control for a suspension apparatus within the vehicle 100. For example, the suspension operating portion 623 can control the suspension apparatus to reduce vibration of the vehicle 100 when a bump is present on a road. The suspension operating portion 623 can also individually control each of a plurality of suspensions.

The door/window operating unit 630 can perform an electronic control for a door apparatus or a window apparatus within the vehicle 100. The door/window operating unit 630 may include a door operating portion 631 and a window operating portion 632. The door operating portion 631 can perform the control for the door apparatus and can control opening or closing of a plurality of doors of the vehicle 100. The door operating portion 631 can control opening or closing of a trunk or a tail gate, and control opening or closing of a sunroof.

The window operating portion 632 can perform the electronic control for the window apparatus and control opening or closing of a plurality of windows of the vehicle 100. Further, the safety apparatus operating unit 640 can perform an electronic control for various safety apparatuses within the vehicle 100. The safety apparatus operating unit 640 may include an airbag operating portion 641, a seatbelt operating portion 642 and a pedestrian protecting apparatus operating portion 643.

The airbag operating portion 641 can perform an electronic control for an airbag apparatus within the vehicle 100. For example, the airbag operating portion 641 can control the airbag to be deployed upon a detection of a risk. Also, the seatbelt operating portion 642 can perform an electronic control for a seatbelt apparatus within the vehicle 100. For example, the seatbelt operating portion 642 can control passengers to be motionlessly seated in seats 110FL, 110FR, 110RL, 110RR using seatbelts upon a detection of a risk.

In addition, the pedestrian protecting apparatus operating portion 643 can perform an electronic control for a hood lift and a pedestrian airbag. For example, the pedestrian protecting apparatus operating portion 643 can control the hood lift and the pedestrian airbag to be open up upon detecting pedestrian collision.

Further, the lamp operating unit 650 can perform an electronic control for various lamp apparatuses within the vehicle 100. The air-conditioner operating unit 660 can perform an electronic control for an air conditioner within the vehicle 100. For example, the air-conditioner operating unit 660 can control the air conditioner to supply cold air into the vehicle when internal temperature of the vehicle is high.

Also, the vehicle operating apparatus 600 may include a processor, and each unit of the vehicle operating apparatus 600 may individually include a processor. The vehicle operating apparatus 600 can also operate according to the control of the controller 170. Further, the operation system 700 controls various driving modes of the vehicle 100 and may include a driving system 710, a parking exit system 740 and a parking system 750.

The operation system 700 may further include other components in addition to components to be described, or may not include some of the components to be described. The operation system 700 may include a processor and each unit of the operation system 700 may individually include a processor.

The operation system can be a sub concept of the controller 170 when it is implemented in a software configuration. Further, the operation system 700 can be a concept including at least one of the user interface apparatus 200, the object detecting apparatus 300, the communication apparatus 400, the vehicle operating apparatus 600 and the controller 170.

The driving system 710 can perform driving of the vehicle 100 and receive navigation information from a navigation system 770, transmit a control signal to the vehicle operating apparatus 600, and perform driving of the vehicle 100. The driving system 710 can receive object information from the object detecting apparatus 300, transmit a control signal to the vehicle operating apparatus 600 and perform driving of the vehicle 100. The driving system 710 can also receive a signal from an external device through the communication apparatus 400, transmit a control signal to the vehicle operating apparatus 600, and perform driving of the vehicle 100.

Further, the parking exit system 740 can perform an exit of the vehicle 100 from a parking lot. For example, the parking exit system 740 can receive navigation information from the navigation system 770, transmit a control signal to the vehicle operating apparatus 600, and perform the exit of the vehicle 100 from the parking lot. The parking exit system 740 can also receive object information from the object detecting apparatus 300, transmit a control signal to the vehicle operating apparatus 600 and perform the exit of the vehicle 100 from the parking lot. Further, the parking exit system 740 can receive a signal from an external device through the communication apparatus 400, transmit a control signal to the vehicle operating apparatus 600, and perform the exit of the vehicle 100 from the parking lot.

The parking system 750 can perform parking of the vehicle 100. For example, the parking system 750 can receive navigation information from the navigation system 770, transmit a control signal to the vehicle operating apparatus 600, and park the vehicle 100. The parking system 750 can receive object information from the object detecting apparatus 300, transmit a control signal to the vehicle operating apparatus 600 and park the vehicle 100. The parking system 750 can receive a signal from an external device through the communication apparatus 400, transmit a control signal to the vehicle operating apparatus 600, and park the vehicle 100.

The navigation system 770 provides navigation information and may include at least one of map information, information regarding a set destination, path information according to the set destination, information regarding various objects on a path, lane information and current location information of the vehicle. The navigation system 770 may include a memory and a processor. The memory can store the navigation information, and the processor can control an operation of the navigation system 770.

Further, the navigation system 770 can update prestored information by receiving information from an external device through the communication apparatus 400. The navigation system 770 can be classified as a sub component of the user interface apparatus 200.

In addition, the sensing unit 120 can sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 can also acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like. The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

In addition, the interface unit 130 serves as a path allowing the vehicle 100 to interface with various types of external devices connected thereto. For example, the interface unit 130 can be provided with a port connectable with a mobile terminal, and connected to the mobile terminal through the port. In this instance, the interface unit 130 can exchange data with the mobile terminal.

The interface unit 130 can also serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

Further, the memory 140 is electrically connected to the controller 170 and can store basic data for units, control data for controlling operations of units and input/output data. The memory 140 may be a variety of storage devices, such as ROM, RAM, EPROM, a flash drive, a hard drive and the like in a hardware configuration. The memory 140 can also store various data for overall operations of the vehicle 100, such as programs for processing or controlling the controller 170. The memory 140 can be integrated with the controller 170 or implemented as a sub component of the controller 170.

Further, the controller 170 can control an overall operation of each unit of the vehicle 100 and can be referred to as an Electronic Control Unit (ECU). The power supply unit 190 supplies power required for an operation of each component according to the control of the controller 170. Specifically, the power supply unit 190 can receive power supplied from an internal battery of the vehicle, and the like.

At least one processor and the controller 170 included in the vehicle 100 can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

The vehicle 100 according to the present disclosure may also include a vehicle control device 800. The vehicle control device 800 can control at least one of those components illustrated in FIG. 7. From this perspective, the vehicle control device 800 can be the controller 170. Without a limit to this, the vehicle control device 800 can be a separate device, independent of the controller 170. When the vehicle control device 800 is implemented as a component independent of the controller 170, the vehicle control device 800 can be provided on a part of the vehicle 100.

Hereinafter, description will be given of an example that the vehicle control device 800 is a component separate from the controller 170 for the sake of explanation. In this specification, functions (operations) and control methods described in relation to the vehicle control device 800 can be executed by the controller 170 of the vehicle. In other words, every detail described in relation to the vehicle control device 800 can be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Figure 8:
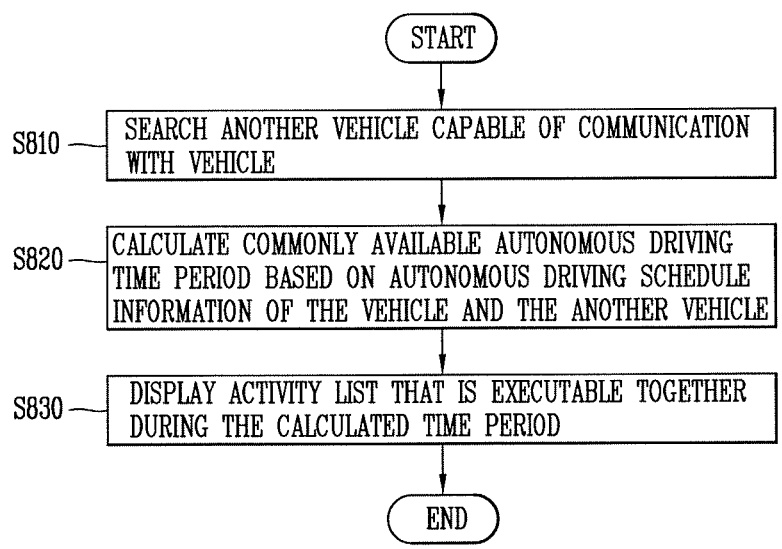
FIG. 8 is a flow chart illustrating a vehicle control method according to the present disclosure.

Hereinafter, a vehicle control method according to the present disclosure will be described in more detail with reference to the accompanying drawings. In particular, FIG. 8 is a flow chart illustrating a vehicle control method according to the present disclosure. Referring to FIG. 8, the process (S810) of searching for another vehicle capable of communicating with the vehicle is performed. The search for another vehicle capable of communicating with the vehicle can be performed according to various preset search criteria.

For example, the search for another communicable vehicle can be performed based on current or autonomous driving start information. Further, the vehicle can be in a driving state or in a pre-driving state. Specifically, based on the autonomous driving schedule information of the vehicle, it is possible to search for another vehicle capable of communicating with the vehicle at a time when the vehicle starts autonomous driving. In other words, another vehicle capable of communicating with the vehicle at the relevant time can be predicted in consideration of a type of road to be autonomously driven, an autonomous driving route, a communication state, a driving mode, and the like.

It is also possible to search a plurality of other vehicles capable of currently performing V2X communication with the vehicle. Specifically, it is possible to search for a nearby vehicle located within a predetermined distance from the vehicle, a vehicle capable of communicating with the vehicle above a predetermined strength, a vehicle whose destination or expected driving route is similar to the vehicle.

Also, a number of vehicles to be searched and connected can be set in advance. Specifically, when a number of searched and connected vehicles is set to six or less, only a list of six vehicles having priorities among the searched vehicles can be displayed on an image display device in the vehicle.

Subsequently, the process (S820) of calculating a commonly available autonomous driving time period based on the autonomous driving schedule information of the vehicle and the other vehicle is performed. For this purpose, it is possible to receive the autonomous driving schedule information of the other vehicle from the other vehicle.

Next, the process (S830) of displaying a list of activities that are executable together during the calculated time period is performed. The activities can be performed by a plurality of vehicles, and provided in various ways such as game, chat, video conference, content (video) sharing, and the like.

In addition, a time period required for an activity to be displayed can be within a commonly available autonomous driving time period. In other words, an activity list that can be completed within a commonly available autonomous driving time period can be displayed. In another example, an executable activity list can be displayed in consideration of a number of expected activity participants based on a number of passengers in the vehicle and the other vehicle. For a specific example, when the number of passengers in the vehicle and the other vehicles is four, activities with a minimum number of five or more participants can be excluded from the activity list.

Subsequently, one of activities in the activity list can be selected from a passenger of the vehicle, and a participation request of the selected activity can be transmitted to the other vehicle. Accordingly, when the participation request is approved by the other vehicle, the selected activity can be executed at a time when a preset condition is satisfied.

For example, the preset condition may include when an execution start time reserved to execute the selected activity is reached, when all the vehicles that have decided to participate perform autonomous driving, when the number of participants required for execution of the activity is satisfied, or the like. Each of the steps in FIG. 8 can be performed in a server or vehicle, and the function can be implemented through an application.

In FIG. 8, a method of searching for another vehicle capable of communicating with the vehicle, and then recommending a list of activities that are executable within a commonly available autonomous driving time period with the other vehicle has been described. In another embodiment similar thereto, an activity to be performed can be selected from an activity list, and then another vehicle capable of performing the activity together can be searched. For example, the search of another vehicle can be made at the time of requesting the activity list after the vehicle starts autonomous driving.

Figure 9:
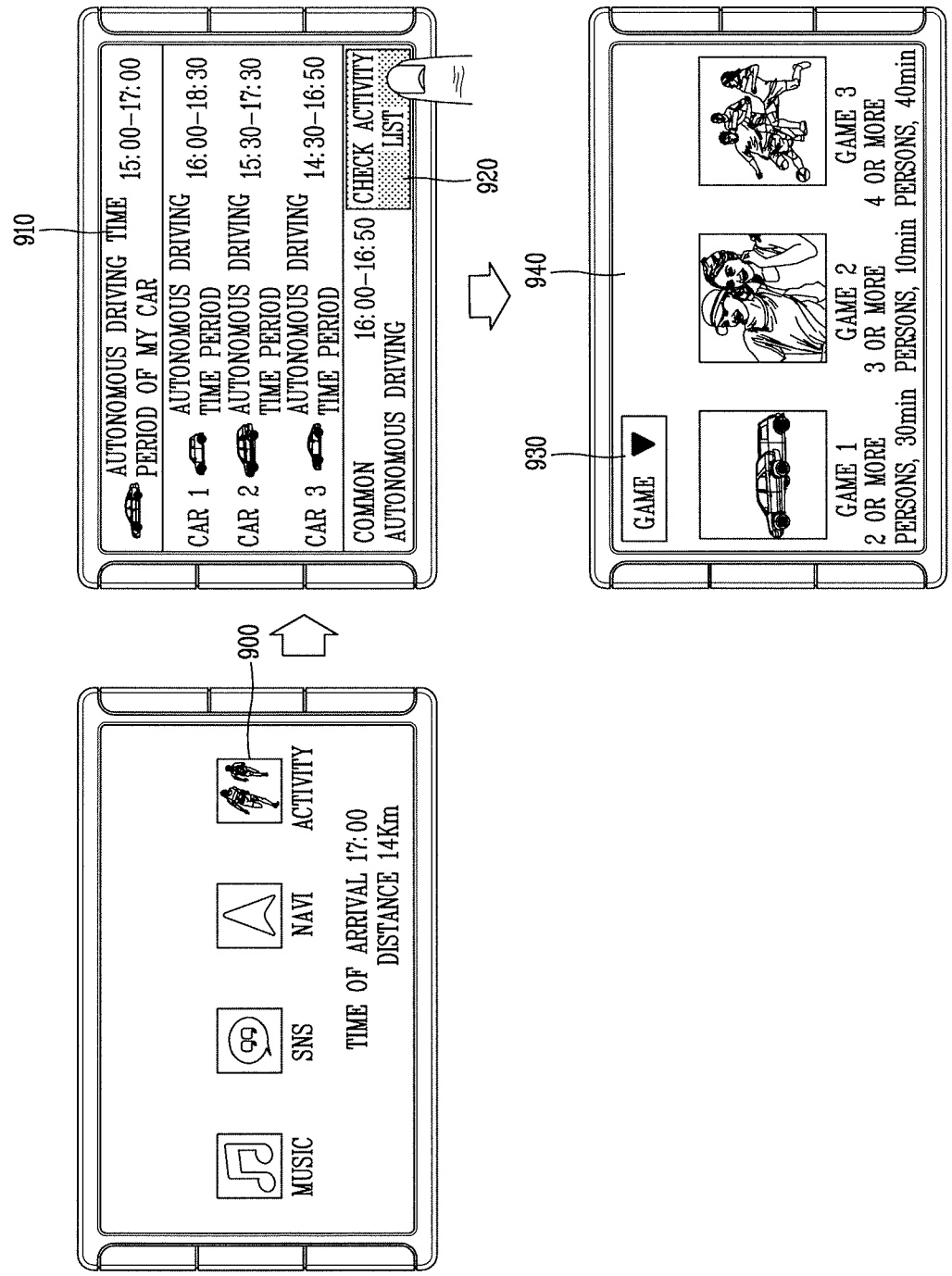
FIG. 9 is a conceptual view illustrating an embodiment in which an activity list is provided.

FIG. 9 is a conceptual view illustrating an embodiment in which an activity list is provided. Referring to FIG. 9, it is possible to search various other vehicles capable of performing V2X communication with the vehicle while driving. For example, it is possible to search for a nearby vehicle located within a predetermined distance from the vehicle, a vehicle capable of communicating with the vehicle above a predetermined strength, a vehicle whose destination or expected driving route is similar, a vehicle stored in a contact list or the like.

In another example, a number of vehicles to be connected can be set in advance. Accordingly, it is possible to connect with a vehicle having a priority according to a preset criterion among the searched vehicles. For example, three vehicles can be selected and connected in the nearest order among nearby vehicles located within a predetermined distance from the vehicle.

Subsequently, an available autonomous driving time period (autonomous driving schedule information) of the vehicle can be compared with an available autonomous driving time period of the other vehicle connected to the vehicle to calculate a commonly available autonomous driving time period. When a touch input is applied to an application icon 900 for performing an activity during a commonly available autonomous driving time period, an application execution screen 910 can be displayed on an image display device in the vehicle.

Specifically, an autonomous driving time period of my vehicle, autonomous driving time periods of other communicable (connected) vehicles, and an autonomous driving time period during which all of my vehicle and the other vehicles perform autonomous driving. Thus, it is possible to receive autonomous driving reservation information (autonomous driving schedule information) of the other vehicle from the other vehicle.

When a touch input is applied to an icon 920 for checking an activity list on the application execution screen 910, a screen 940 showing the activity list that can be performed during a commonly available autonomous driving time period can be displayed. A touch input can be applied to a selection window 930 capable of selecting a category of an activity to select one category from game, chat, video conference, and content sharing. When a game is selected as the category of the activity, a list of games that are executable during a commonly available autonomous driving time period can be displayed.

A game name, a minimum number of participants, a required time, and the like can be displayed on the displayed game list. Further, the time required for the displayed game can be within a commonly available autonomous driving time period. In other words, a list of games that can be completed within a commonly available autonomous driving time period can be displayed. In addition, a minimum number of participants in the displayed game can be within a number of other connected vehicles. In other words, a game list allowing a user to play a game with other connected vehicles without having to add participants can be displayed. Subsequently, when a touch input is applied to one of games on the displayed game list, the relevant game can be executed within a commonly available autonomous driving time period.

Figure 10:
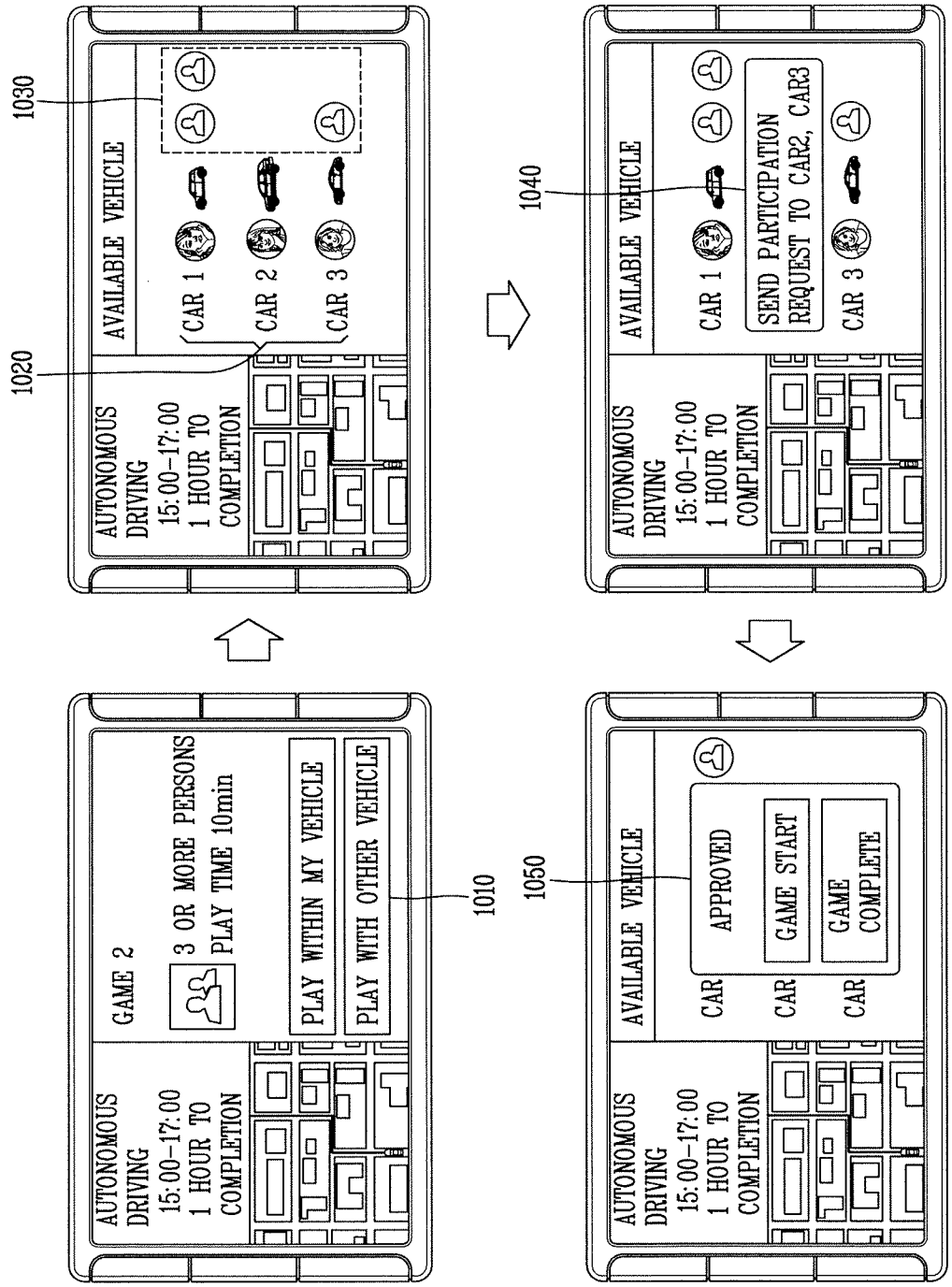
FIG. 10 is a conceptual view illustrating an embodiment of selecting a specific activity from an activity list in FIG. 9, and transmitting a participation request.

Next, FIG. 10 is a conceptual view illustrating an embodiment of selecting a specific activity from an activity list in FIG. 9, and transmitting a participation request. Referring to FIG. 10, a touch input can be applied to Game 2 on the displayed game list to select the game.

When a vehicle is currently in an autonomous driving mode, the driving information of the vehicle such as an autonomous driving time period, an autonomous driving end time, and a driving route can be displayed at one side of the divided screens. Information related to the selected Game 2 can be displayed on the remaining divided screen.

The information related to Game 2 may include a game name, a minimum number of participants, a time required, and the like. Furthermore, when a touch input is applied to an icon for playing a game within my vehicle, it is possible to start Game 2 with a virtual player.

In addition, when a touch input is applied to an icon 1010 for playing a game with other vehicles, a list of other vehicles 1020 that can send a game participation request can be displayed. For example, the list of the vehicles 1020 can be a list of connected other vehicles, or can be a list of only other autonomously driving vehicles among the connected other vehicles. In another example, whether or not other vehicles are autonomously driving or the passenger information 1030 of other vehicles, and the like can be displayed together.

When a touch input is applied to a list of the second vehicle and the third vehicle, a participation request message of Game 2 can be transmitted to each of the other vehicles. Then, a pop-up window 1040 notifying the message can be displayed on an image display device.

Subsequently, when a message is received from the second vehicle and the third vehicle to approve the participation of Game 2, a pop-up window 1050 can be displayed to notify the approval. In addition, icons for starting a game can be displayed in the pop-up window 1050. Specifically, an icon for starting a game immediately or an icon for reserving a game start time can be displayed.

When a touch input is applied to a game start icon, Game 2 can be started when my vehicle and other vehicles that have approved the participation request are currently in an autonomous driving mode. When a touch input is applied to a game reservation icon, a screen for reserving a game start time can be displayed.

Further, in order to execute the selected activity, the execution start time of the selected activity can be set based on the autonomous driving schedule information of the vehicle and the other vehicle that has approved the participation request, and the selected activity can be executed when the execution start time is reached.

In addition, the execution start time of the activity can be set within a time period during which both the vehicle and the other vehicle that has approved the participation request perform autonomous driving. Specifically, the execution start time of the activity can be set to a time at which both the vehicle and the other vehicle that has approved the participation request start autonomous driving.

Figure 11:
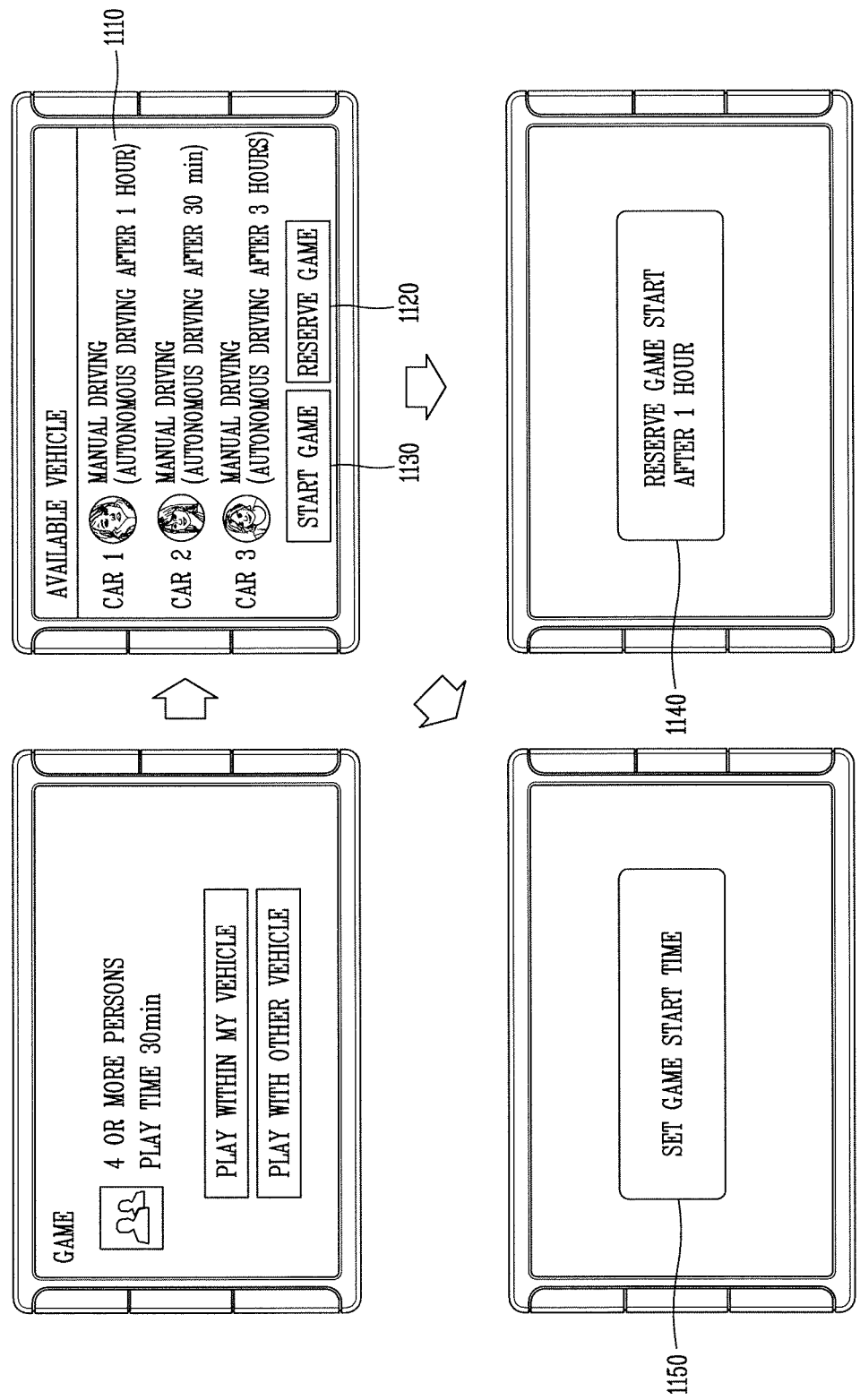
FIG. 11 is a conceptual view illustrating an embodiment of setting an activity execution start time.

FIG. 11 is a conceptual view illustrating an embodiment of setting an activity execution start time. Referring to FIG. 11, when a game is selected from among an activity list and playing a game with other vehicles is selected, information 1110 of other vehicles connected through communication can be displayed.

Further, information such as whether another vehicle is in an autonomous or manual driving mode, passenger information, an autonomous driving start time, an autonomous driving end time, and the like can be displayed. In another example, when a touch input is applied to a game start icon 1120, a game can be started immediately with a simple guidance message when both the vehicle and the other vehicles perform autonomous driving.

When a touch input is applied to the game start icon 1120, when some of the vehicle and the other vehicles perform manual driving, a game can be started at a time when all of the vehicle and the other vehicles start autonomous driving. Specifically, a first other vehicle can be in a manual driving mode and start autonomous driving after one hour, and a second other vehicle may also be in a manual driving mode and start autonomous driving after 30 minutes, and a third other vehicle can be in an autonomous driving mode. In this instance, a game can be reserved to be started after one hour when all of the first other vehicle, the second other vehicle and the third other vehicle start autonomous driving, and a notification message 1140 can be displayed.

In yet still another example, when a touch input is applied to a game reservation icon 1130, a guide message 1150 for setting a game start time can be displayed. Then, a screen for setting the game start time can be displayed. For example, a passenger can directly enter a game start time to set the game start time.

Further, in order to execute the selected activity, the vehicle and the other vehicles that have approved the participation request can be switched to autonomous driving when the execution start time is reached. For example, unlike autonomous driving schedule information at the execution start time, there can be a situation where the vehicle is still driving manually. Alternatively, there can be other vehicles scheduled to drive manually at a reserved execution start time.

Figure 12:
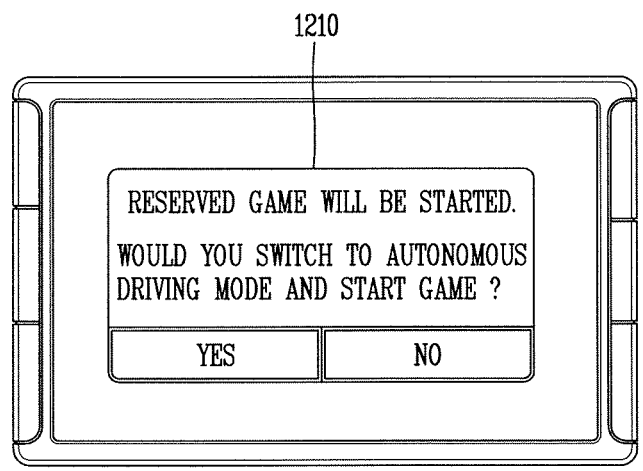
FIG. 12 is a conceptual view illustrating an embodiment of displaying a message on a manually driven vehicle at an execution start time.

Next, FIG. 12 is a conceptual view illustrating an embodiment of displaying a message on a manually driven vehicle at an execution start time. Referring to FIG. 12, when the vehicle is driving manually at a reserved activity execution start time, a message 1210 asking whether or not to change to autonomous driving for the start of the reserved activity can be displayed. Subsequently, when a change to autonomous driving for the start of the activity is accepted, the relevant activity can be executed.

Figure 13:
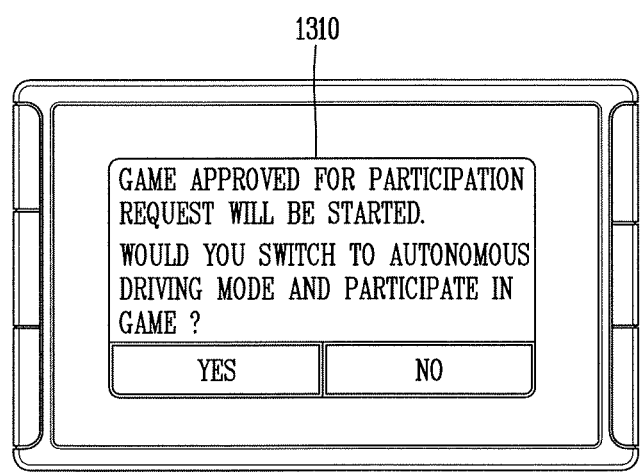
FIG. 13 is a conceptual view illustrating an embodiment of displaying a message on another manually driven vehicle at an execution start time.

FIG. 13 is a conceptual view illustrating an embodiment of displaying a message on another manually driven vehicle at an execution start time. Referring to FIG. 13, when another vehicle is driving manually at a reserved activity execution start time, a message 1310 asking whether or not to change to autonomous driving to participate in a reserved activity can be displayed. Subsequently, when a change to autonomous driving to participate in the activity is accepted, the relevant activity can be executed.

In addition, a change to autonomous driving to participate in the activity may not be accepted by another vehicle. That is, another vehicle may be unable to participate in the activity at the execution start time. For example, there can be various situations, such as when driving is terminated or it has difficulty in switching to autonomous driving, or when the other vehicle simply does not want to participate.

In this regard, there are various embodiments. When another vehicle that has been unable to participate in an activity at an execution start time can participate within a predetermined time period, a standby state for a predetermined time period can be maintained. When the activity is executable with only the remaining participants, the relevant activity can be executed.

When the activity is non-executable with only the remaining participants, another new vehicle for participation can be searched or the selected activity can be changed. In other words, when a number of participants required to execute the selected activity is satisfied, the selected activity can be executed.

When the number of participants is not satisfied, another vehicle capable of communicating with the vehicle can be searched again, and a participation request of the selected activity can be transmitted to the re-searched another vehicle. The number of participants required to execute an activity can be set (limited) to a minimum or maximum number of persons. The number of participants can be a number that is unable to execute the relevant activity or a number that is arbitrarily set by a driver of the vehicle if it is not satisfied.

In one embodiment, the relevant game can be executed only when a minimum number of persons required to progress the game is satisfied even if the reserved game execution start time is reached. Furthermore, the participants may include passengers in addition to drivers of the vehicle or another vehicle. When a passenger of the other vehicle executes an activity in place of or on behalf of the drivers or other passengers, the relevant activity can be automatically executed at the reserved execution start time.

As described above, based on a number of passengers of the vehicle and the other vehicle, an activity list considering an expected number of participants in an activity can be preferentially recommended. When the number of passengers of the vehicle and the other vehicle is four, activities having a minimum number of participants of five or more can be excluded from the activity list.

Hereinafter, in FIGS. 14 and 15, an embodiment of searching another vehicle again or changing an activity when a minimum number of participants in the activity is insufficient will be described in detail. In particular, FIG. 14 is a conceptual view illustrating an embodiment of searching another vehicle again when a minimum number of participants in an activity is insufficient.

Figure 14:
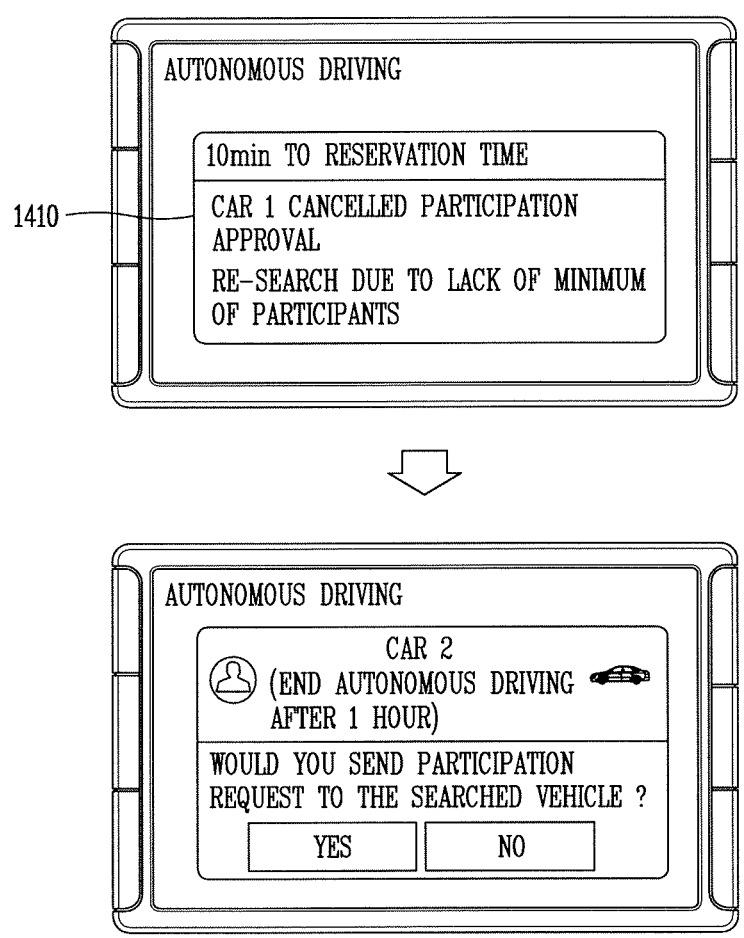
FIG. 14 is a conceptual view illustrating an embodiment of searching another vehicle again when a minimum number of participants in an activity is insufficient.

Referring to FIG. 14, some other vehicles have canceled the participation approval at an execution start time or before a predetermined time from the execution start time, and as a result, a minimum number of participants required to execute the activity can be insufficient, and thus a message 1410 notifying that another communicable vehicle is being searched can be displayed.

In other words, another vehicle capable of stably communicating with the vehicle to perform the activity can be searched again. Specifically, it is possible to search for a nearby vehicle located within a predetermined distance from the vehicle, a vehicle capable of communicating with the vehicle above a predetermined strength, a vehicle whose destination or expected driving route is similar, a vehicle stored in a contact list or the like.

In another example, since the present vehicle and the remaining vehicles are waiting for the execution of the selected activity, another newly searched vehicle can be selected as a vehicle that is highly likely to participate in the activity immediately. In other words, a search condition such as a vehicle that is currently performing autonomous driving, a vehicle having a history of executing the activity before, or the like can be added.

When another new vehicle is searched, a message 1420 asking whether or not to transmit a message of an activity participation request to the relevant another vehicle can be displayed. Then, when the relevant another vehicle approves the activity participation request, the activity can be performed.

When a minimum number of participants is insufficient, a new activity list that is executable with only the remaining persons can be recommended. Further, a vehicle occupant may directly select an activity to be newly performed or select it by voting with other vehicle occupants.

Figure 15:
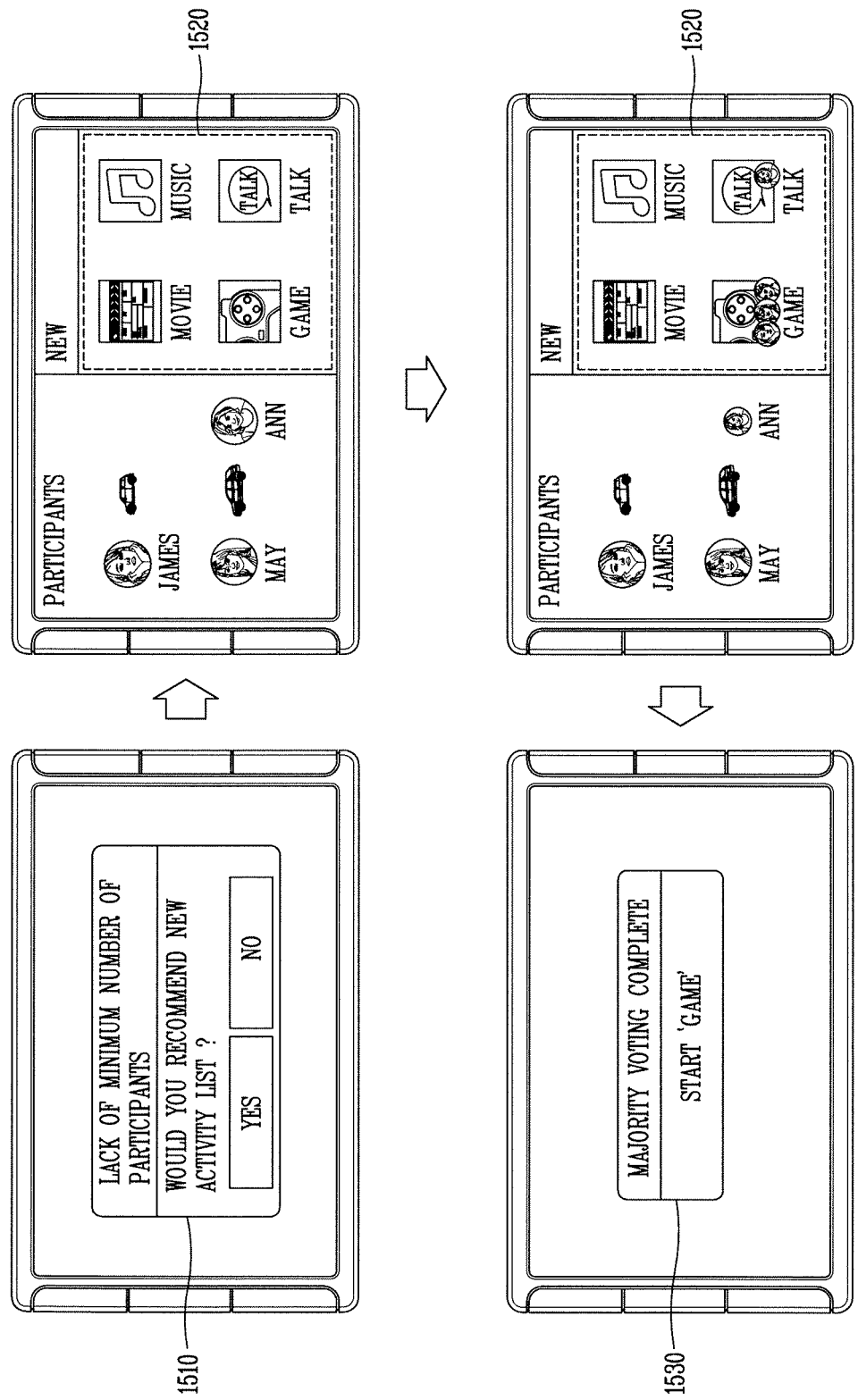
FIG. 15 is a conceptual view illustrating an embodiment of recommending a new activity list when a minimum number of participants in an activity is insufficient.

Next, FIG. 15 is a conceptual view illustrating an embodiment of recommending a new activity list when a minimum number of participants in an activity is insufficient. Referring to FIG. 15, a message 1510 suggesting a new activity list recommendation can be displayed due to a shortage of the minimum number of participants. Specifically, a new activity list 1520 considering autonomous driving schedule information of the vehicle and the remaining other vehicle can be recommended again to allow a passenger of the vehicle to select a new activity. Subsequently, a participation request of the selected activity can be transmitted to the remaining other vehicles, and the activity can be executed upon approval.

In another example, an activity to be performed among the newly recommended activity list 1520 can be determined through voting. Accordingly, when a participant selects an activity desired to be executed, an icon indicating that the participant has selected the activity can be displayed. For a specific example, a name of participant, a profile photo, an ID, the vehicle information of the participant (another vehicle information), and the like can be displayed. Then, a message 1530 notifying the execution of an activity selected by a plurality of participants is displayed, and the relevant activity can be executed.

The embodiment of FIG. 15, namely, an embodiment of determining an activity to be executed by voting can be also applied to when a vehicle occupant completes an initially selected activity and then determines an activity to be subsequently performed with the existing participants. In other words, a vehicle occupant completes an initially selected activity, and then an activity to be subsequently performed together can be determined by a majority of votes with existing participants.

Further, the activity can be suspended or terminated based on occurrence of a preset specific situation in at least one of the vehicle and another vehicle that has approved the participation request during execution of the activity. The specific situation may include when a communication intensity of the vehicle or another vehicle falls below a predetermined level, when at least one of the vehicle and the other vehicle is switched to a manual driving mode by an emergency situation or emergency button click or the operation is terminated, when a suspension (termination) or withdrawal request is received from another vehicle, when a participant enters into an area where participation in an activity is difficult due to legal problems.

The suspended activity can be resumed when the specific situation is terminated. Alternatively, an activity can be terminated and then other vehicle that are able to participate can be searched to execute the activity again. In addition, the activity can be suspended prior to entering a region in which a communication intensity falls below a preset level when the vehicle enters the region during the execution of the activity.

A region with a low communication strength can be defined as a region in which efficient communication for executing activities is difficult due to terrain, weather, regional characteristics, insufficient communication infrastructure, and so on. Further, a time required to get out of the region can be calculated, and the suspended activity can be resumed when the required time has passed.

Figure 16:
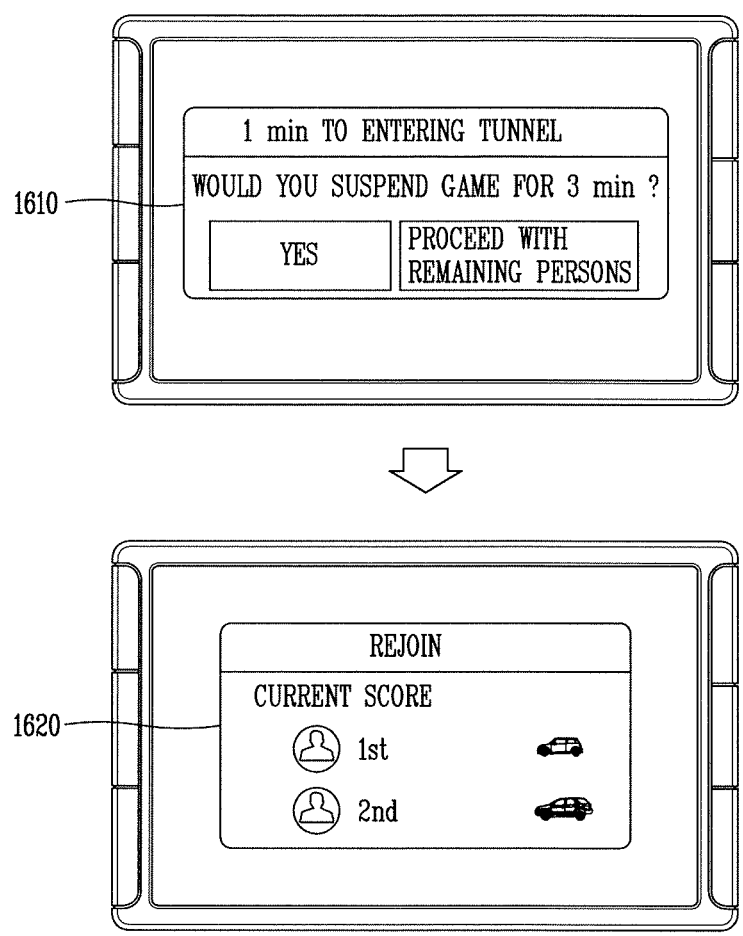
FIG. 16 is a conceptual view illustrating an embodiment related to suspending or terminating an activity according to a communication strength.

FIG. 16 is a conceptual view illustrating an embodiment related to suspending or terminating an activity according to communication strength. Referring to FIG. 16, a message 1610 asking whether to suspend an activity for a time period of three minutes required to pass through a tunnel can be displayed one minute before the vehicle enters the tunnel.

Depending on the selection of a vehicle occupant, the activity can be suspended for three minutes, or the remaining persons may continuously participate in the activity. Further, the suspension of the activity can be made only when there is consent of other participants.

When the activity is suspended, a message notifying the suspension of the activity and a message notifying resumption subsequent to the suspension can be transmitted to another vehicle. In another example, when the remaining persons continue to participate in the activity, the content 1620 of the activity that has been performed for three minutes during which they were unable to participate can be displayed when participating again subsequent to passing through the tunnel.

This is an embodiment, and for an activity being executed, whether to suspend, terminate or continue the activity can be set differently depending on whether or not a specific situation has occurred in the vehicle or another vehicle. Further, whether or not the activity being executed can be continuously performed only by the remaining persons can be taken into consideration.

For a specific example, when the specific situation occurs in the vehicle, the activity can be suspended and then resumed after a predetermined time. Further, the suspension of the activity can be made only when there is consent of other participants. When the operation of the vehicle is terminated, the relevant activity can be terminated or the relevant activity can be completed by the remaining participants.

When the specific situation occurs in another vehicle, the remaining persons may continue the activity. Then, when another vehicle participates again, the content of the activity that has been executed can be transmitted to the other vehicle. If another vehicle takes a long time to participate again, then the relevant activity can be terminated. Then, another vehicle to participate again will be searched, and then the relevant activity will be newly started.

Also, when the specific situation has occurred but the activity cannot be executed by only the remaining persons, the activity can be suspended or terminated regardless of whether the specific situation has occurred in the vehicle or another vehicle. Further, when the autonomous driving route of the vehicle or the other vehicle includes a route that can affect the execution of the activity, it is possible to change an autonomous driving route of the vehicle or the other vehicle.

Figure 17:
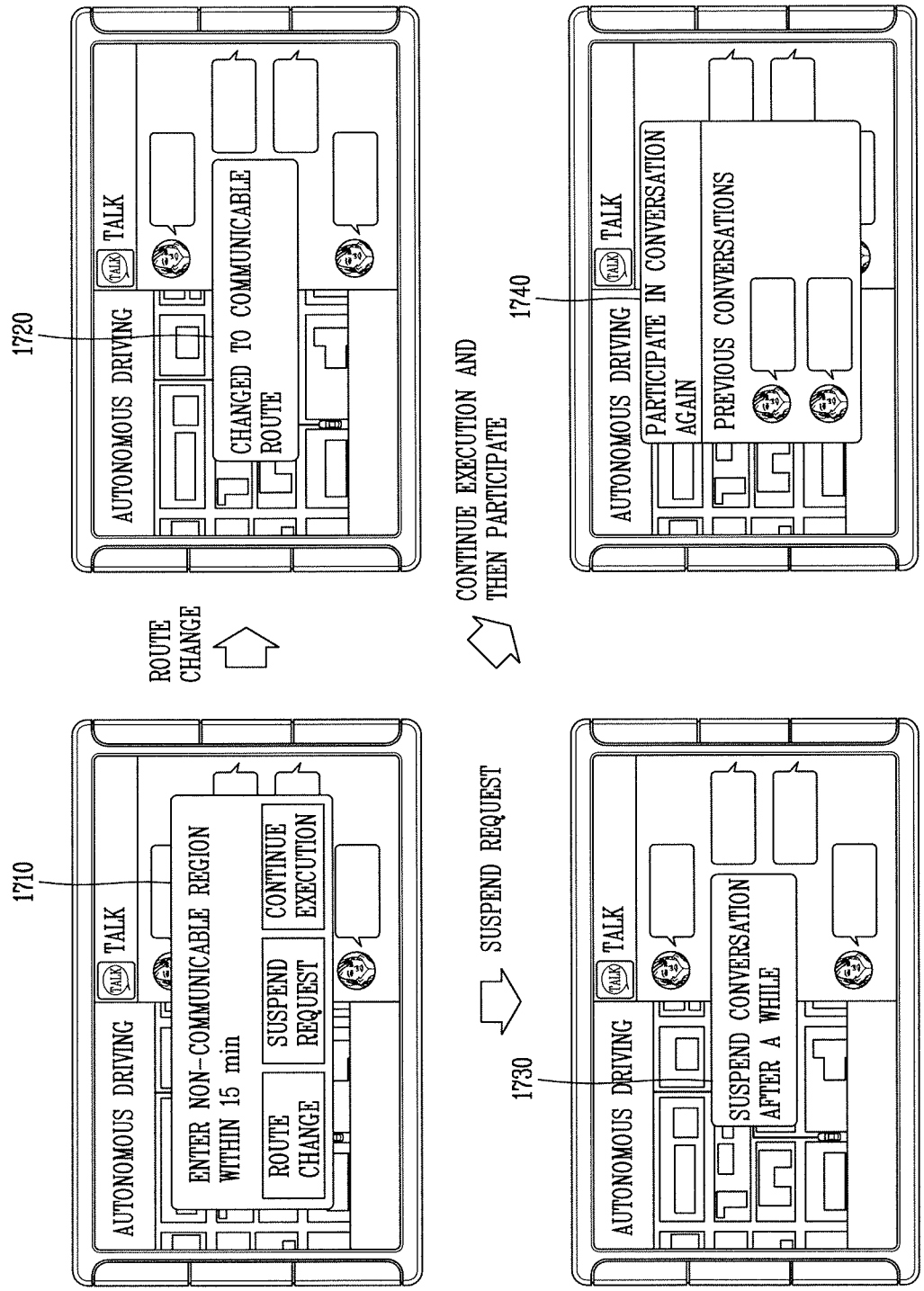
FIG. 17 is a conceptual view illustrating an embodiment related to changing an autonomous driving route when entering a non-communicable region.

FIG. 17 is a conceptual view illustrating an embodiment related to changing an autonomous driving route when entering a non-communicable region. Referring to FIG. 17, when the vehicle or another vehicle enters a non-communicable region communication after a predetermined time period in a situation where an activity is selected through a messenger conversation, a pop-up window 1710 for selecting an option of a route change, a suspend request and a continuous execution can be displayed.

When selecting an option of the route change, an autonomous driving route of the relevant vehicle can be changed to a communicable route. Accordingly, a message 1720 indicating that it has been changed to a communicable route can be displayed.

When selecting an option of the suspend request, the suspension of a messenger conversation can be requested to the other vehicle. When the other vehicle approves the suspend request of a messenger conversation, a message 1730 notifying that the conversation is suspended for a predetermined time period (a time period required to leave a non-communicable region) before a predetermined time period from the time of entering the non-communicable region can be displayed on the vehicle and the other vehicle.

In still another example, when selecting an option of the continuous execution, a previous conversation history 1740 can be displayed when joining the conversation again after leaving the non-communicable region. Further, an expected autonomous driving end time of the vehicle or the other vehicle can be compared with an expected end time of the activity to change an autonomous driving route of the vehicle or the other vehicle or adjust a speed of the vehicle or the other vehicle.

When there is a concern that the activity may not be completed since the expected autonomous driving end time is shorter than the activity end time, the autonomous driving route can be changed or the speed can be decreased to complete the activity.

Figure 18:
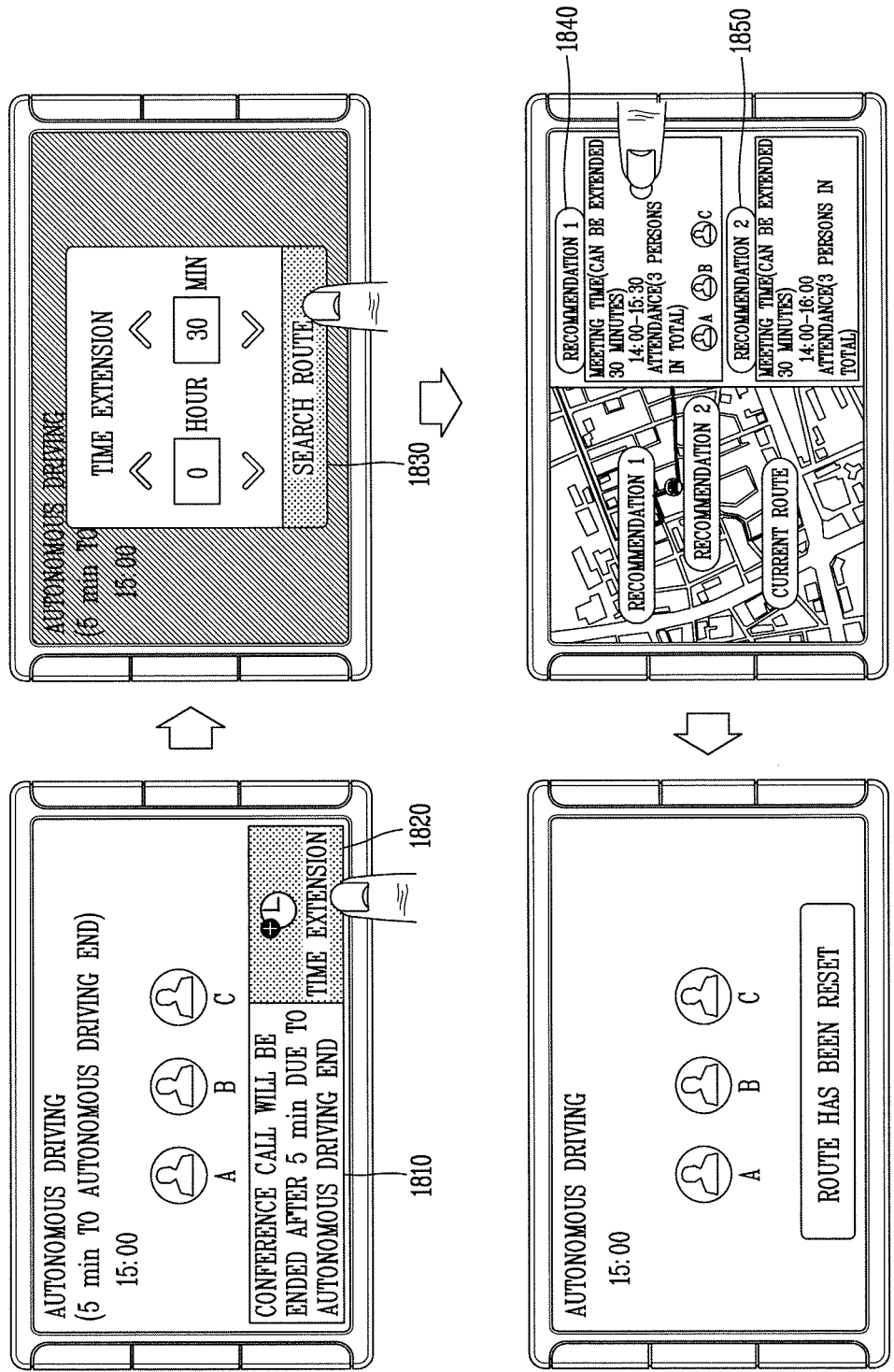
FIG. 18 is a conceptual view illustrating an embodiment of changing an autonomous driving route to extend an activity execution time period.

FIG. 18 is a conceptual view illustrating an embodiment of changing an autonomous driving route to extend an activity execution time period. Referring to FIG. 18, when the autonomous driving end time is insufficient during a meeting that is in the selected activity, a message 1810 indicating it can be displayed. Accordingly, when a touch input is applied to an icon 1820 of time extension, a pop-up window for extending a meeting time can be displayed. An extended time can be entered to extend the meeting time, and then a touch input can be applied to a route search icon 1830 for searching an autonomous driving route suitable for the extended time.

As a result, autonomous driving routes 1840, 1850 capable of traveling for 30 minutes or more (extended time or more) from a current position to a destination can be recommended. If one of the routes 1840 is selected, the meeting can be continued as the autonomous driving route is reset to the relevant route 1840.

Figure 19:
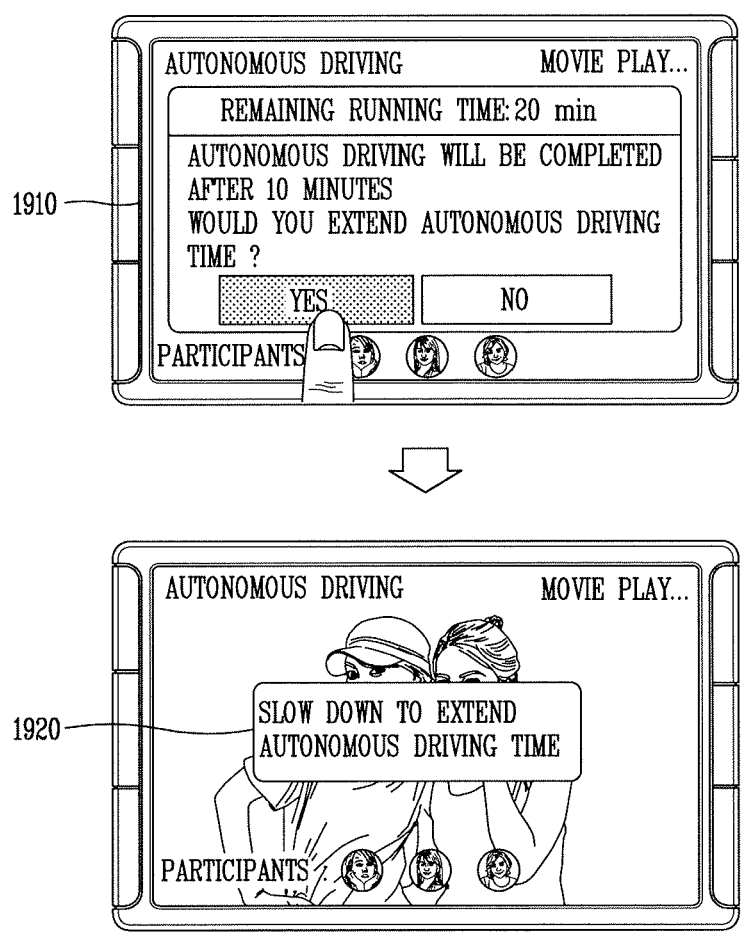
FIG. 19 is a conceptual view illustrating an embodiment of changing an autonomous driving speed to extend an activity execution time period.

FIG. 19 is a conceptual view illustrating an embodiment of changing an autonomous driving speed to extend an activity execution time period. Referring to FIG. 19, when a time required to complete autonomous driving is shorter than the remaining time during movie watching that is the selected activity, a message 1910 asking whether or not to extend the autonomous driving time can be displayed.

Accordingly, when the autonomous driving time is extended, a message 1920 notifying slow driving for this purpose can be displayed. Further, the speed control of the vehicle can be performed within a range capable of safely driving the vehicle. When the vehicle providing content terminates autonomous driving, it can receive a request for autonomous driving time extension or route change from another vehicle. For a specific embodiment, when an autonomous driving end time of the vehicle providing a video is insufficient, a message asking whether or not to extend an autonomous driving time period and continuously provide a video can be received from the other vehicle.

Also, in order to continuously execute an activity, the vehicle may stop for a while or maintain a parked state. For yet still another example, the relevant activity can be executed for a predetermined time period even after reaching the destination. According to the foregoing embodiments, an activity can be preferentially completed according to circumstances or a vehicle operation can be preferentially considered by suspending or terminating the activity.

The searching step (S810) illustrated in FIG. 8 may include searching for another vehicle capable of communicating with the vehicle within a range of allowing platooning (group driving) with the vehicle. Then, when the vehicle and the other vehicle that has approved the participation request are arranged to do platooning, the selected activity can be executed.

In other words, the same activity can be performed together while the vehicle and the other vehicle are platooning. Further, all the vehicles that are platooning can be directed to the same destination, but the present disclosure is not limited thereto. For example, another vehicle may participate in platooning until they arrive at a specific destination or only for a predetermined period of time.

When platooning is performed, it is assumed that a vehicle 2010 that has proposed platooning is a master vehicle, and other vehicles 2020, 2030 that have approved platooning are slave vehicles, and the master vehicle may be disposed at a specific position at the head or the center of the platooning arrangement. In addition, when platooning is performed, a minimum activity execution condition will be satisfied if only the leading vehicle can perform autonomous driving.

In other words, the leading vehicle should be an autonomous driving vehicle, and the remaining slave vehicles can perform the activity to follow the master vehicle even if they are unable to perform autonomous driving. Furthermore, the slave vehicles may continue platooning by targeting the master vehicle even if the autonomous driving mode is changed in the middle.

Figure 20:
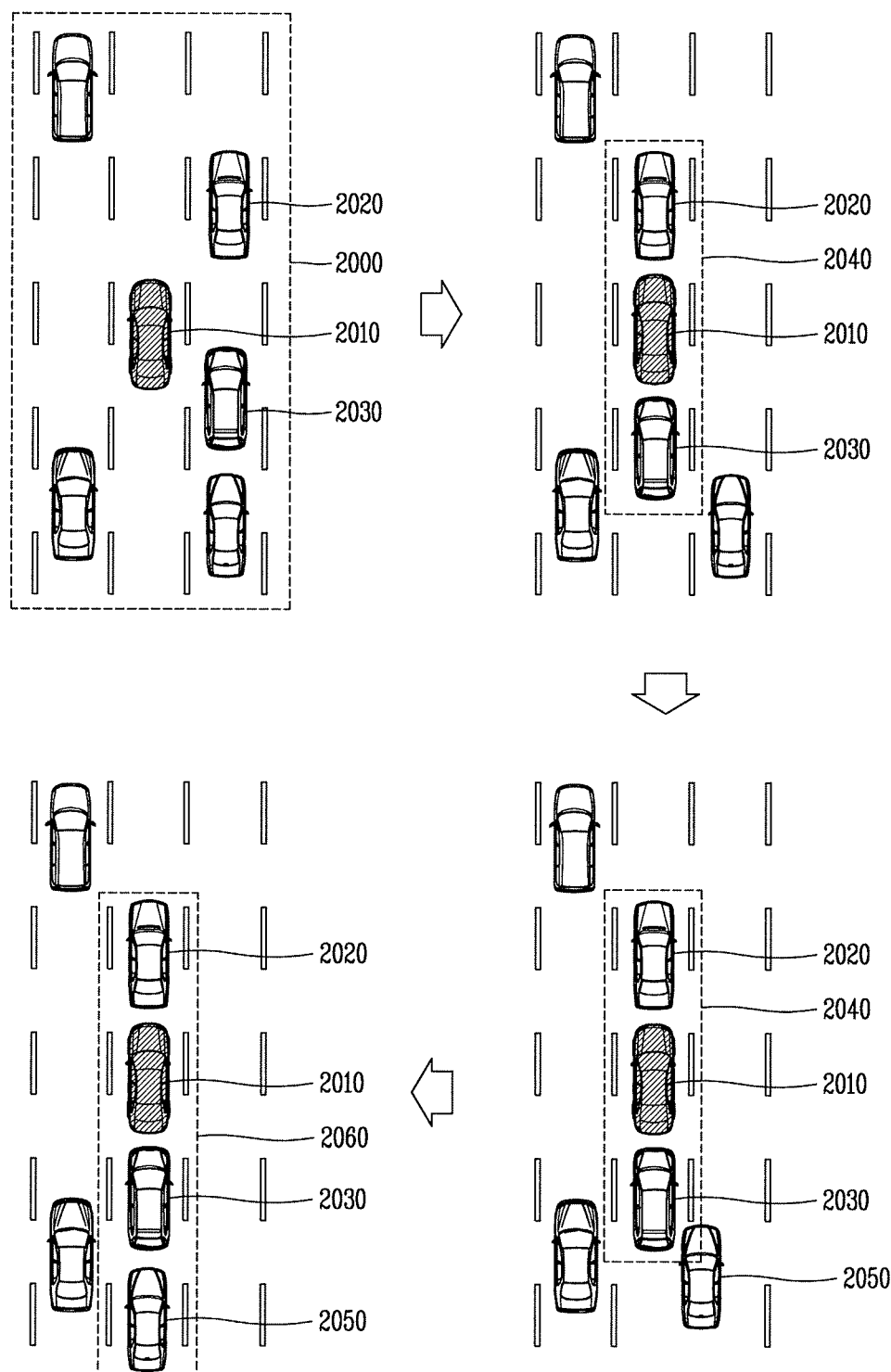
FIG. 20 is a conceptual view illustrating an embodiment of performing an activity together while performing platooning.

FIG. 20 is a conceptual view illustrating an embodiment of performing an activity together while performing platooning. Referring to FIG. 20, it is possible to search for other vehicles capable of communicating with the vehicle 2010 within a range 2000 in which platooning with the vehicle 2010 is allowed. Then, the vehicle can transmit a message of a platooning request and an activity participation request to the searched other vehicles (partial selection is also allowed).

Specifically, as described above, a list of activities that can be performed together while the vehicle 2010 and the other vehicles perform autonomous driving in common can be recommended based on the autonomous driving schedule information of the vehicle 2010 and the autonomous driving schedule information of other vehicles capable of platooning. Then, a passenger of the vehicle 2010 can select an activity to be executed. Accordingly, the other vehicles 2020, 2030 that have approved platooning and participation in the activity and the vehicle 2010 can be arranged for platooning.

In one embodiment, it is assumed that a vehicle 2010 that has proposed platooning is a master vehicle, and other vehicles 2020, 2030 that have approved platooning are slave vehicles, and the master vehicle is disposed at a specific position at the head or the center of the platooning arrangement. When platooning is complete, the selected activity can be performed. Further, display information 2040 indicating that they are platooning can be displayed in various manners on external other vehicles.

A guideline (virtual platooning region) surrounding the vehicle 2010 and the other vehicles 2020, 2030 that are platooning can be displayed on a road. Further, a platooning arrangement of the vehicle and the other vehicles can be changed to satisfy a preset condition.

A platooning arrangement of the vehicle and the other vehicles can be maintained or a new route can be set to maintain a communication strength above a predetermined level. For example, when they are going to pass through a tunnel, the route can be changed to a new route that does not pass through the tunnel.

In another embodiment, it is possible to change a platooning arrangement of the vehicle and the other vehicles based on the characteristics of the activity being executed. Also, an interval between the vehicle 2010 and the other vehicles 2020, 2030 performing platooning can be kept constant. In addition, in order to execute an activity, the route can be changed or the autonomous driving time period can be extended to continue autonomous driving.

Further, when one of the other vehicles performing platooning departs from a virtual platooning region including the vehicle and the other vehicles performing platooning, a message for checking whether or not to depart from the platooning and terminate the activity can be transmitted to the departed vehicle.

In addition, when another vehicle enters the virtual platooning region, information related to the platooning and the activity can be transmitted to the entered vehicle. In other words, depending on departure from and entry into a virtual platooning region, it can be determined whether or not to perform platooning and participate in the activity.

Referring again to FIG. 20, when one of vehicles 2010, 2020, 2030 that are platooning departs from a virtual platooning region 2040, a check message can be sent to the departed vehicle. In other words, a message for checking whether or not to terminate platooning and end participation in the activity can be sent.

In another example, when another vehicle 2050 enters the virtual platooning region 2040, the other vehicle 2050 can be informed that they are platooning and execute a specific activity together. Accordingly, when the other vehicle 2050 requests platooning and participation in the activity, it can participate in the platooning and the activity after obtaining the approval of a passenger of the vehicle 2010 or the consent of passengers of the other vehicle 2020, 2030.

As a result, the other vehicle 2050 can also be arranged to platoon. In this instance, a new virtual platooning region 2060 can be created. Further, information related to the platooning route can be shared between the vehicle and the other vehicle performing platooning.

When searching for another vehicle within a range in which platooning is allowed, a range of search can be limited to another vehicle traveling to the same or similar destination. Furthermore, stopover or destination related information can be shared (activity). For example, attractions in stopover or destination, discount information, recommendation information, a quick route, and the like can be shared.

In addition, master-slave vehicles can be set up, and the master vehicle can share information (share content) with the slave vehicle. For example, a vehicle that has proposed platooning can be set to a master vehicle, and another vehicle that has approved platooning may set to a slave vehicle. Furthermore, as described above, a position between the master vehicle and the slave vehicle can be adjusted based on the activity or signal strength.

FIG. 21 is a conceptual view illustrating an embodiment of sharing information while performing platooning. Referring to FIG. 21, when platooning vehicles go to the same destination, recommendation information related to the destination can be shared. For example, attractions around the destination, restaurant information, and the like can be shared.

Further, when the passenger of the master vehicle sets one place of them to a destination, platooning can be performed for the relevant place as the destination. Accordingly, a message 2110 indicating that a route having the relevant place as the destination has been updated can be displayed.

The embodiments of the present invention provide several advantages. For example, it is possible to perform a specific activity with several other vehicle occupants during a commonly available autonomous driving time period. Further, the activity can be effectively performed in consideration of whether or not autonomous driving is performed, a communication strength, a movement route, and the like. In addition, effective platooning can be achieved by performing an activity that shares destination related information while performing platooning.

The foregoing present disclosure may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include a processor or controller. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of controlling a vehicle, the method comprising:
    wirelessly communicating, via a wireless communication unit, with at least one other vehicle;

displaying, via a display, a list of activities that are executable together during a commonly available autonomous driving time period where both the vehicle and the least one other vehicle are operated in an autonomous driving mode;

receiving, via a controller, a selection of an activity in the displayed list of activities; and displaying, via the display, an execution screen of the selected activity during the commonly available autonomous driving period, wherein the commonly available autonomous driving period is determined based on autonomous driving schedule information of the vehicle and the at least one other vehicle.

2. The method of claim 1, further comprising:

setting an execution start time of the selected activity based on the autonomous driving schedule information of the vehicle and the other vehicle; and displaying the execution screen of the selected activity on the display when the execution start time is reached.

3. The method of claim 2, wherein the execution start time of the selected activity is set within a time period during which both the vehicle and the other vehicle are operated in the autonomous driving mode.

4. The method of claim 1, further comprising:

displaying the execution screen of the selected activity on the display when a number of participants required to execute the selected activity is satisfied; and wirelessly communicating with another vehicle and requesting participation of the selected activity to the another vehicle when the number of participants is not satisfied.

5. The method of claim 1, further comprising:

suspending or terminating the selected activity based on occurrence of a preset situation in the vehicle or the at least one other vehicle.

6. The method of claim 5, wherein the preset situation corresponds to the vehicle entering a region in which a communication intensity falls below a preset level; and wherein the method further comprises resuming the selected activity when the vehicle has left the region and the communication intensity is above the preset level.

7. The method of claim 1, further comprising:

changing an autonomous driving route of the vehicle or the at least other vehicle when the autonomous driving route of the vehicle or the at least one other vehicle includes a route affecting the execution of the selected activity.

8. The method of claim 1, further comprising:

changing an autonomous driving route or a speed of the vehicle or the at least one other vehicle when an expected autonomous driving end time of the vehicle or the at least one other vehicle does not match an expected end time of the selected activity.

9. The method of claim 1, further comprising:

displaying the execution screen of the selected activity when the vehicle and the at least one other vehicle are platooning; and changing a platooning arrangement of the vehicle and the at least one other vehicle to satisfy a preset condition or to maintain a communication strength above a predetermined level.

10. The method of claim 9, further comprising:

in response to the least one other vehicle performing platooning departing from a virtual platooning region including the vehicle and the at least one other vehicle, transmitting a message to the least one other vehicle asking whether or not to depart from the platooning and terminate the activity.

11. The method of claim 10, further comprising:

transmitting information related to the platooning and the activity to the at least one other vehicle when the at least one other vehicle enters the virtual platooning region.

12. The method of claim 9, further comprising:

sharing information related to a route of the platooning between the vehicle and the at least one other vehicle performing the platooning.

13. An electronic apparatus in a vehicle, the electronic apparatus comprising:

a wireless communication unit configured to wirelessly communicate with at least one other vehicle;

a display configured to display a list of activities that are executable together during a commonly available autonomous driving time period where both the vehicle and the least one other vehicle are operated in an autonomous driving mode; and a controller configured to:

receive a selection of an activity in the displayed list of activities, and display an execution screen of the selected activity on the display during the commonly available autonomous driving period, wherein the commonly available autonomous driving period is determined based on autonomous driving schedule information of the vehicle and the at least one other vehicle.

14. The electronic apparatus of claim 13, wherein the controller is further configured to:

set an execution start time of the selected activity based on the autonomous driving schedule information of the vehicle and the other vehicle, and display the execution screen of the selected activity on the display when the execution start time is reached.

15. The electronic apparatus of claim 14, wherein the execution start time of the activity is set within a time period during which both the vehicle and the other vehicle are operated in the autonomous driving mode.

16. The electronic apparatus of claim 13, wherein the controller is further configured to:

display the execution screen of the selected activity on the display when a number of participants required to execute the selected activity is satisfied, and wirelessly communicate, via the wireless communication unit, with another vehicle and request participation of the of the selected activity to the another vehicle when the number of participants is not satisfied.

17. The electronic apparatus of claim 13, wherein the controller is further configured to:

suspend or terminate the selected activity based on occurrence of a preset situation in the vehicle or the at least one other vehicle.

18. The electronic apparatus of claim 17, wherein the preset situation corresponds to the vehicle entering a region in which a communication intensity falls below a preset level, and wherein the controller is further configured to resume the selected activity when the vehicle has left the region and the communication intensity is above the preset level.

* * * * *